United States Patent
Kennewick, Sr.

(10) Patent No.: US 11,087,385 B2
(45) Date of Patent: Aug. 10, 2021

(54) VOICE COMMERCE

(71) Applicant: VB Assets, LLC, Bellevue, WA (US)

(72) Inventor: Michael R. Kennewick, Sr., Bellevue, WA (US)

(73) Assignee: VB Assets, LLC, Bellevue, WA (US)

( * ) Notice: Subject to any disclaimer, the term of this patent is extended or adjusted under 35 U.S.C. 154(b) by 0 days.

(21) Appl. No.: 16/553,553

(22) Filed: Aug. 28, 2019

(65) Prior Publication Data

US 2019/0385218 A1    Dec. 19, 2019

Related U.S. Application Data

(63) Continuation of application No. 15/484,930, filed on Apr. 11, 2017, now Pat. No. 10,430,863, which is a
(Continued)

(51) Int. Cl.
*G06Q 30/00* (2012.01)
*G06Q 30/06* (2012.01)
(Continued)

(52) U.S. Cl.
CPC ..... *G06Q 30/0635* (2013.01); *G06Q 30/0601* (2013.01); *G06Q 30/0625* (2013.01);
(Continued)

(58) Field of Classification Search
None
See application file for complete search history.

(56) References Cited

U.S. PATENT DOCUMENTS

| 4,430,669 A | 2/1984 | Cheung |
| 4,821,027 A | 4/1989 | Mallory |

(Continued)

FOREIGN PATENT DOCUMENTS

| CN | 1433554 A | 7/2003 |
| CN | 1860496 A | 11/2006 |

(Continued)

OTHER PUBLICATIONS

Office Action issued in Chinese Patent Application No. 201580060519.1 dated Mar. 13, 2020, with its English translation, 40 pages.
(Continued)

*Primary Examiner* — Mila Airapetian
(74) *Attorney, Agent, or Firm* — Sheppard Mullin Richter & Hampton LLP

(57) ABSTRACT

In certain implementations, a system for facilitating voice commerce is provided. A user input comprising a natural language utterance related to a product or service to be purchased may be received. A first product or service that is to be purchased may be determined based on the utterance. First payment information that is to be used to purchase the first product or service may be obtained. First shipping information that is to be used to deliver the first product or service may be obtained. A purchase transaction for the first product or service may completed based on the first payment information and the first shipping information without further user input, after the receipt of utterance, that identifies a product or service type or a product or service, seller information, payment information, shipping information, or other information related to purchasing the first product or service.

40 Claims, 6 Drawing Sheets

Related U.S. Application Data continuation of application No. 14/855,334, filed on Sep. 15, 2015, now Pat. No. 9,626,703.

(60) Provisional application No. 62/051,273, filed on Sep. 16, 2014.

(51) Int. Cl.
  *G10L 15/22* (2006.01)
  *G10L 15/18* (2013.01)

(52) U.S. Cl.
  CPC .......... *G10L 15/1815* (2013.01); *G10L 15/22* (2013.01); *G10L 15/18* (2013.01); *G10L 2015/223* (2013.01)

(56) References Cited

U.S. PATENT DOCUMENTS

| | | |
|---|---|---|
| 4,829,423 A | 5/1989 | Tennant |
| 4,887,212 A | 12/1989 | Zamora |
| 4,910,784 A | 3/1990 | Doddington |
| 5,027,406 A | 6/1991 | Roberts |
| 5,155,743 A | 10/1992 | Jacobs |
| 5,164,904 A | 11/1992 | Sumner |
| 5,208,748 A | 5/1993 | Flores |
| 5,265,065 A | 11/1993 | Turtle |
| 5,274,560 A | 12/1993 | LaRue |
| 5,331,554 A | 7/1994 | Graham |
| 5,357,596 A | 10/1994 | Takebayashi |
| 5,369,575 A | 11/1994 | Lamberti |
| 5,377,350 A | 12/1994 | Skinner |
| 5,386,556 A | 1/1995 | Hedin |
| 5,424,947 A | 6/1995 | Nagao |
| 5,471,318 A | 11/1995 | Ahuja |
| 5,475,733 A | 12/1995 | Eisdorfer |
| 5,479,563 A | 12/1995 | Yamaguchi |
| 5,488,652 A | 1/1996 | Bielby |
| 5,499,289 A | 3/1996 | Bruno |
| 5,500,920 A | 3/1996 | Kupiec |
| 5,517,560 A | 5/1996 | Greenspan |
| 5,533,108 A | 7/1996 | Harris |
| 5,537,436 A | 7/1996 | Bottoms |
| 5,539,744 A | 7/1996 | Chu |
| 5,557,667 A | 9/1996 | Bruno |
| 5,559,864 A | 9/1996 | Kennedy, Jr. |
| 5,563,937 A | 10/1996 | Bruno |
| 5,577,165 A | 11/1996 | Takebayashi |
| 5,590,039 A | 12/1996 | Ikeda |
| 5,608,635 A | 3/1997 | Tamai |
| 5,615,296 A | 3/1997 | Stanford |
| 5,617,407 A | 4/1997 | Bareis |
| 5,633,922 A | 5/1997 | August |
| 5,634,086 A | 5/1997 | Rtischev |
| 5,652,570 A | 7/1997 | Lepkofker |
| 5,675,629 A | 10/1997 | Raffel |
| 5,696,965 A | 12/1997 | Dedrisk |
| 5,708,422 A | 1/1998 | Blonder |
| 5,721,938 A | 2/1998 | Stuckey |
| 5,722,084 A | 2/1998 | Chakrin |
| 5,729,659 A | 3/1998 | Potter |
| 5,740,256 A | 4/1998 | CastelloDaCosta |
| 5,742,763 A | 4/1998 | Jones |
| 5,748,841 A | 5/1998 | Morin |
| 5,748,974 A | 5/1998 | Johnson |
| 5,752,052 A | 5/1998 | Richardson |
| 5,754,784 A | 5/1998 | Garland |
| 5,761,631 A | 6/1998 | Nasukawa |
| 5,774,841 A | 6/1998 | Salazar |
| 5,774,859 A | 6/1998 | Houser |
| 5,794,050 A | 8/1998 | Dahlgren |
| 5,794,196 A | 8/1998 | Yegnanarayanan |
| 5,797,112 A | 8/1998 | Komatsu |
| 5,799,276 A | 8/1998 | Komissarchik |
| 5,802,510 A | 9/1998 | Jones |
| 5,829,000 A | 10/1998 | Huang |
| 5,837,721 A | 11/1998 | Jones |
| 5,839,107 A | 11/1998 | Gupta |
| 5,848,396 A | 12/1998 | Gerace |
| 5,855,000 A | 12/1998 | Waibel |
| 5,860,059 A | 1/1999 | Aust |
| 5,867,817 A | 2/1999 | Catallo |
| 5,878,385 A | 3/1999 | Bralich |
| 5,878,386 A | 3/1999 | Coughlin |
| 5,892,813 A | 4/1999 | Morin |
| 5,892,900 A | 4/1999 | Ginter |
| 5,895,464 A | 4/1999 | Bhandari |
| 5,895,466 A | 4/1999 | Goldberg |
| 5,897,613 A | 4/1999 | Chan |
| 5,898,760 A | 4/1999 | Smets |
| 5,899,991 A | 5/1999 | Karch |
| 5,902,347 A | 5/1999 | Backman |
| 5,911,120 A | 6/1999 | Jarett |
| 5,918,222 A | 6/1999 | Fukui |
| 5,926,784 A | 7/1999 | Richardson |
| 5,933,822 A | 8/1999 | Braden-Harder |
| 5,950,167 A | 9/1999 | Yaker |
| 5,953,393 A | 9/1999 | Culbreth |
| 5,960,384 A | 9/1999 | Brash |
| 5,960,397 A | 9/1999 | Rahim |
| 5,960,399 A | 9/1999 | Barclay |
| 5,960,447 A | 9/1999 | Holt |
| 5,963,894 A | 10/1999 | Richardson |
| 5,963,940 A | 10/1999 | Liddy |
| 5,982,906 A | 11/1999 | Ono |
| 5,983,190 A | 11/1999 | Trowerll |
| 5,987,404 A | 11/1999 | DellaPietra |
| 5,991,721 A | 11/1999 | Asano |
| 5,995,119 A | 11/1999 | Cosatto |
| 5,995,928 A | 11/1999 | Nguyen |
| 5,995,943 A | 11/1999 | Bull |
| 6,009,382 A | 12/1999 | Martino |
| 6,014,559 A | 1/2000 | Amin |
| 6,018,708 A | 1/2000 | Dahan |
| 6,021,384 A | 2/2000 | Gorin |
| 6,028,514 A | 2/2000 | Lemelson |
| 6,035,267 A | 3/2000 | Watanabe |
| 6,044,347 A | 3/2000 | Abella |
| 6,049,602 A | 4/2000 | Foladare |
| 6,049,607 A | 4/2000 | Marash |
| 6,058,187 A | 5/2000 | Chen |
| 6,067,513 A | 5/2000 | Ishimitsu |
| 6,073,098 A | 6/2000 | Buchsbaum |
| 6,076,057 A | 6/2000 | Narayanan |
| 6,076,059 A | 6/2000 | Glickman |
| 6,078,886 A | 6/2000 | Dragosh |
| 6,081,774 A | 6/2000 | deHita |
| 6,081,779 A | 6/2000 | Besling |
| 6,085,186 A | 7/2000 | Christianson |
| 6,101,241 A | 8/2000 | Boyce |
| 6,108,631 A | 8/2000 | Ruhl |
| 6,119,087 A | 9/2000 | Kuhn |
| 6,119,101 A | 9/2000 | Peckover |
| 6,122,613 A | 9/2000 | Baker |
| 6,134,235 A | 10/2000 | Goldman |
| 6,144,667 A | 11/2000 | Doshi |
| 6,144,938 A | 11/2000 | Surace |
| 6,154,526 A | 11/2000 | Dahlke |
| 6,160,883 A | 12/2000 | Jackson |
| 6,167,377 A | 12/2000 | Gillick |
| 6,173,250 B1 | 1/2001 | Jong |
| 6,173,266 B1 | 1/2001 | Marx |
| 6,173,279 B1 | 1/2001 | Levin |
| 6,175,858 B1 | 1/2001 | Bulfer |
| 6,185,535 B1 | 2/2001 | Hedin |
| 6,188,982 B1 | 2/2001 | Chiang |
| 6,192,110 B1 | 2/2001 | Abella |
| 6,192,338 B1 | 2/2001 | Haszto |
| 6,195,634 B1 | 2/2001 | Dudemaine |
| 6,195,651 B1 | 2/2001 | Handel |
| 6,199,043 B1 | 3/2001 | Happ |
| 6,208,964 B1 | 3/2001 | Sabourin |
| 6,208,972 B1 | 3/2001 | Grant |
| 6,219,346 B1 | 4/2001 | Maxemchuk |
| 6,219,643 B1 | 4/2001 | Cohen |

(56) References Cited

U.S. PATENT DOCUMENTS

| | | |
|---|---|---|
| 6,219,645 B1 | 4/2001 | Byers |
| 6,226,612 B1 | 5/2001 | Srenger |
| 6,233,556 B1 | 5/2001 | Teunen |
| 6,233,559 B1 | 5/2001 | Balakrishnan |
| 6,233,561 B1 | 5/2001 | Junqua |
| 6,236,968 B1 | 5/2001 | Kanevsky |
| 6,243,679 B1 | 6/2001 | Mohri |
| 6,246,981 B1 | 6/2001 | Papineni |
| 6,246,990 B1 | 6/2001 | Happ |
| 6,266,636 B1 | 7/2001 | Kosaka |
| 6,269,336 B1 | 7/2001 | Ladd |
| 6,272,455 B1 | 8/2001 | Hoshen |
| 6,272,461 B1 | 8/2001 | Meredith |
| 6,275,231 B1 | 8/2001 | Obradovich |
| 6,278,377 B1 | 8/2001 | DeLine |
| 6,278,968 B1 | 8/2001 | Franz |
| 6,286,002 B1 | 9/2001 | Axaopoulos |
| 6,288,319 B1 | 9/2001 | Catona |
| 6,292,767 B1 | 9/2001 | Jackson |
| 6,301,560 B1 | 10/2001 | Masters |
| 6,308,151 B1 | 10/2001 | Smith |
| 6,311,159 B1 | 10/2001 | VanTichelen |
| 6,314,402 B1 | 11/2001 | Monaco |
| 6,321,196 B1 | 11/2001 | Franceschi |
| 6,356,869 B1 | 3/2002 | Chapados |
| 6,362,748 B1 | 3/2002 | Huang |
| 6,366,882 B1 | 4/2002 | Bijl |
| 6,366,886 B1 | 4/2002 | Dragosh |
| 6,374,214 B1 | 4/2002 | Friedland |
| 6,374,226 B1 | 4/2002 | Hunt |
| 6,377,913 B1 | 4/2002 | Coffman |
| 6,377,919 B1 | 4/2002 | Burnett |
| 6,381,535 B1 | 4/2002 | Durocher |
| 6,385,596 B1 | 5/2002 | Wiser |
| 6,385,646 B1 | 5/2002 | Brown |
| 6,389,398 B1 | 5/2002 | Lustgarten |
| 6,393,403 B1 | 5/2002 | Majaniemi |
| 6,393,428 B1 | 5/2002 | Miller |
| 6,397,181 B1 | 5/2002 | Li |
| 6,404,878 B1 | 6/2002 | Jackson |
| 6,405,170 B1 | 6/2002 | Phillips |
| 6,408,272 B1 | 6/2002 | White |
| 6,411,810 B1 | 6/2002 | Maxemchuk |
| 6,411,893 B2 | 6/2002 | Ruhl |
| 6,415,257 B1 | 7/2002 | Junqua |
| 6,418,210 B1 | 7/2002 | Sayko |
| 6,420,975 B1 | 7/2002 | DeLine |
| 6,429,813 B2 | 8/2002 | Feigen |
| 6,430,285 B1 | 8/2002 | Bauer |
| 6,430,531 B1 | 8/2002 | Polish |
| 6,434,523 B1 | 8/2002 | Monaco |
| 6,434,524 B1 | 8/2002 | Weber |
| 6,434,529 B1 | 8/2002 | Walker |
| 6,442,522 B1 | 8/2002 | Carberry |
| 6,446,114 B1 | 9/2002 | Bulfer |
| 6,453,153 B1 | 9/2002 | Bowker |
| 6,453,292 B2 | 9/2002 | Ramaswamy |
| 6,456,711 B1 | 9/2002 | Cheung |
| 6,456,974 B1 | 9/2002 | Baker |
| 6,466,654 B1 | 10/2002 | Cooper |
| 6,466,899 B1 | 10/2002 | Yano |
| 6,470,315 B1 | 10/2002 | Netsch |
| 6,487,494 B2 | 11/2002 | Odinak |
| 6,487,495 B1 | 11/2002 | Gale |
| 6,498,797 B1 | 12/2002 | Anerousis |
| 6,499,013 B1 | 12/2002 | Weber |
| 6,501,833 B2 | 12/2002 | Phillips |
| 6,501,834 B1 | 12/2002 | Milewski |
| 6,505,155 B1 | 1/2003 | Vanbuskirk |
| 6,510,417 B1 | 1/2003 | Woods |
| 6,513,006 B2 | 1/2003 | Howard |
| 6,522,746 B1 | 2/2003 | Marchok |
| 6,523,061 B1 | 2/2003 | Halverson |
| 6,526,335 B1 | 2/2003 | Treyz |
| 6,532,444 B1 | 3/2003 | Weber |
| 6,539,348 B1 | 3/2003 | Bond |
| 6,549,629 B2 | 4/2003 | Finn |
| 6,553,372 B1 | 4/2003 | Brassell |
| 6,556,970 B1 | 4/2003 | Sasaki |
| 6,556,973 B1 | 4/2003 | Lewin |
| 6,560,576 B1 | 5/2003 | Cohen |
| 6,560,590 B1 | 5/2003 | Shwe |
| 6,567,778 B1 | 5/2003 | ChaoChang |
| 6,567,797 B1 | 5/2003 | Schuetze |
| 6,567,805 B1 | 5/2003 | Johnson |
| 6,570,555 B1 | 5/2003 | Prevost |
| 6,570,964 B1 | 5/2003 | Murveit |
| 6,571,279 B1 | 5/2003 | Herz |
| 6,574,597 B1 | 6/2003 | Mohri |
| 6,574,624 B1 | 6/2003 | Johnson |
| 6,578,022 B1 | 6/2003 | Foulger |
| 6,581,103 B1 | 6/2003 | Dengler |
| 6,584,439 B1 | 6/2003 | Geilhufe |
| 6,587,858 B1 | 7/2003 | Strazza |
| 6,591,185 B1 | 7/2003 | Polidi |
| 6,591,239 B1 | 7/2003 | McCall |
| 6,594,257 B1 | 7/2003 | Doshi |
| 6,594,367 B1 | 7/2003 | Marash |
| 6,598,018 B1 | 7/2003 | Junqua |
| 6,601,026 B2 | 7/2003 | Appelt |
| 6,601,029 B1 | 7/2003 | Pickering |
| 6,604,075 B1 | 8/2003 | Brown |
| 6,604,077 B2 | 8/2003 | Dragosh |
| 6,606,598 B1 | 8/2003 | Holthouse |
| 6,611,692 B2 | 8/2003 | Raffel |
| 6,614,773 B1 | 9/2003 | Maxemchuk |
| 6,615,172 B1 | 9/2003 | Bennett |
| 6,622,119 B1 | 9/2003 | Ramaswamy |
| 6,629,066 B1 | 9/2003 | Jackson |
| 6,631,346 B1 | 10/2003 | Karaorman |
| 6,631,351 B1 | 10/2003 | Ramachandran |
| 6,633,846 B1 | 10/2003 | Bennett |
| 6,636,790 B1 | 10/2003 | Lightner |
| 6,643,620 B1 | 11/2003 | Contolini |
| 6,647,363 B2 | 11/2003 | Claassen |
| 6,650,747 B1 | 11/2003 | Bala |
| 6,658,388 B1 | 12/2003 | Kleindienst |
| 6,678,680 B1 | 1/2004 | Woo |
| 6,681,206 B1 | 1/2004 | Gorin |
| 6,691,151 B1 | 2/2004 | Cheyer |
| 6,701,294 B1 | 3/2004 | Ball |
| 6,704,396 B2 | 3/2004 | Parolkar |
| 6,704,576 B1 | 3/2004 | Brachman |
| 6,704,708 B1 | 3/2004 | Pickering |
| 6,707,421 B1 | 3/2004 | Drury |
| 6,708,150 B1 | 3/2004 | Hirayama |
| 6,721,001 B1 | 4/2004 | Berstis |
| 6,721,633 B2 | 4/2004 | Funk |
| 6,721,706 B1 | 4/2004 | Strubbe |
| 6,726,636 B2 | 4/2004 | DerGhazarian |
| 6,732,088 B1 | 5/2004 | Glance |
| 6,735,592 B1 | 5/2004 | Neumann |
| 6,739,556 B1 | 5/2004 | Langston |
| 6,741,931 B1 | 5/2004 | Kohut |
| 6,742,021 B1 | 5/2004 | Halverson |
| 6,745,161 B1 | 6/2004 | Arnold |
| 6,751,591 B1 | 6/2004 | Gorin |
| 6,751,612 B1 | 6/2004 | Schuetze |
| 6,754,485 B1 | 6/2004 | Obradovich |
| 6,754,627 B2 | 6/2004 | Woodward |
| 6,754,647 B1 | 6/2004 | Tackett |
| 6,757,362 B1 | 6/2004 | Cooper |
| 6,757,544 B2 | 6/2004 | Rangarajan |
| 6,757,718 B1 | 6/2004 | Halverson |
| 6,785,651 B1 | 8/2004 | Wang |
| 6,795,808 B1 | 9/2004 | Strubbe |
| 6,801,604 B2 | 10/2004 | Maes |
| 6,801,893 B1 | 10/2004 | Backfried |
| 6,804,330 B1 | 10/2004 | Jones |
| 6,810,375 B1 | 10/2004 | Ejerhed |
| 6,813,341 B1 | 11/2004 | Mahoney |
| 6,816,830 B1 | 11/2004 | Kempe |
| 6,823,308 B2 | 11/2004 | Keiller |
| 6,829,603 B1 | 12/2004 | Chai |

(56) References Cited

U.S. PATENT DOCUMENTS

| | | | |
|---|---|---|---|
| 6,832,230 B1 | 12/2004 | Zilliacus | |
| 6,833,848 B1 | 12/2004 | Wolff | |
| 6,839,896 B2 | 1/2005 | Coffman | |
| 6,850,603 B1 | 2/2005 | Eberle | |
| 6,856,990 B2 | 2/2005 | Barile | |
| 6,859,776 B1 * | 2/2005 | Cohen | H04M 3/493 704/270 |
| 6,865,481 B2 | 3/2005 | Kawazoe | |
| 6,868,380 B2 | 3/2005 | Kroeker | |
| 6,868,385 B1 | 3/2005 | Gerson | |
| 6,871,179 B1 | 3/2005 | Kist | |
| 6,873,837 B1 | 3/2005 | Yoshioka | |
| 6,877,001 B2 | 4/2005 | Wolf | |
| 6,877,134 B1 | 4/2005 | Fuller | |
| 6,882,970 B1 | 4/2005 | Garner | |
| 6,901,366 B1 | 5/2005 | Kuhn | |
| 6,910,003 B1 | 6/2005 | Arnold | |
| 6,912,498 B2 | 6/2005 | Stevens | |
| 6,915,126 B2 | 7/2005 | Mazzara, Jr. | |
| 6,928,614 B1 | 8/2005 | Everhart | |
| 6,934,756 B2 | 8/2005 | Maes | |
| 6,937,977 B2 | 8/2005 | Gerson | |
| 6,937,982 B2 | 8/2005 | Kitaoka | |
| 6,941,266 B1 | 9/2005 | Gorin | |
| 6,944,594 B2 | 9/2005 | Busayapongchai | |
| 6,950,821 B2 | 9/2005 | Faybishenko | |
| 6,954,755 B2 | 10/2005 | Reisman | |
| 6,959,276 B2 | 10/2005 | Droppo | |
| 6,961,700 B2 | 11/2005 | Mitchell | |
| 6,963,759 B1 | 11/2005 | Gerson | |
| 6,964,023 B2 | 11/2005 | Maes | |
| 6,968,311 B2 | 11/2005 | Knockeart | |
| 6,973,387 B2 | 12/2005 | Masclet | |
| 6,975,983 B1 | 12/2005 | Fortescue | |
| 6,975,993 B1 | 12/2005 | Keiller | |
| 6,980,092 B2 | 12/2005 | Turnbull | |
| 6,983,055 B2 | 1/2006 | Luo | |
| 6,990,513 B2 | 1/2006 | Belfiore | |
| 6,996,531 B2 | 2/2006 | Korall | |
| 7,003,463 B1 | 2/2006 | Maes | |
| 7,016,849 B2 | 3/2006 | Arnold | |
| 7,020,609 B2 | 3/2006 | Thrift | |
| 7,024,364 B2 | 4/2006 | Guerra | |
| 7,027,586 B2 | 4/2006 | Bushey | |
| 7,027,974 B1 | 4/2006 | Busch | |
| 7,027,975 B1 | 4/2006 | Pazandak | |
| 7,031,908 B1 | 4/2006 | Huang | |
| 7,035,415 B2 | 4/2006 | Belt | |
| 7,036,128 B1 | 4/2006 | Julia | |
| 7,043,425 B2 | 5/2006 | Pao | |
| 7,054,817 B2 | 5/2006 | Shao | |
| 7,058,890 B2 | 6/2006 | George | |
| 7,062,488 B1 | 6/2006 | Reisman | |
| 7,069,220 B2 | 6/2006 | Coffman | |
| 7,072,834 B2 | 7/2006 | Zhou | |
| 7,072,888 B1 | 7/2006 | Perkins | |
| 7,076,362 B2 | 7/2006 | Ohtsuji | |
| 7,082,469 B2 | 7/2006 | Gold | |
| 7,085,708 B2 | 8/2006 | Manson | |
| 7,092,928 B1 | 8/2006 | Elad | |
| 7,107,210 B2 | 9/2006 | Deng | |
| 7,107,218 B1 | 9/2006 | Preston | |
| 7,110,951 B1 | 9/2006 | Lemelson | |
| 7,127,395 B1 | 10/2006 | Gorin | |
| 7,127,400 B2 | 10/2006 | Koch | |
| 7,130,390 B2 | 10/2006 | Abburi | |
| 7,136,875 B2 | 11/2006 | Anderson | |
| 7,137,126 B1 | 11/2006 | Coffman | |
| 7,143,037 B1 | 11/2006 | Chestnut | |
| 7,143,039 B1 | 11/2006 | Stifelman | |
| 7,146,315 B2 | 12/2006 | Balan | |
| 7,146,319 B2 | 12/2006 | Hunt | |
| 7,149,696 B2 | 12/2006 | Shimizu | |
| 7,165,028 B2 | 1/2007 | Gong | |
| 7,170,993 B2 | 1/2007 | Anderson | |
| 7,171,291 B2 | 1/2007 | Obradovich | |
| 7,174,300 B2 | 2/2007 | Bush | |
| 7,177,798 B2 | 2/2007 | Hsu | |
| 7,184,957 B2 | 2/2007 | Brookes | |
| 7,190,770 B2 | 3/2007 | Ando | |
| 7,197,069 B2 | 3/2007 | Agazzi | |
| 7,197,460 B1 | 3/2007 | Gupta | |
| 7,203,644 B2 | 4/2007 | Anderson | |
| 7,206,418 B2 | 4/2007 | Yang | |
| 7,207,011 B2 | 4/2007 | Mulvey | |
| 7,215,941 B2 | 5/2007 | Beckmann | |
| 7,228,276 B2 | 6/2007 | Omote | |
| 7,231,343 B1 | 6/2007 | Treadgold | |
| 7,236,923 B1 | 6/2007 | Gupta | |
| 7,254,482 B2 | 8/2007 | Kawasaki | |
| 7,272,212 B2 | 9/2007 | Eberle | |
| 7,277,854 B2 | 10/2007 | Bennett | |
| 7,283,829 B2 | 10/2007 | Christenson | |
| 7,283,951 B2 | 10/2007 | Marchisio | |
| 7,289,606 B2 | 10/2007 | Sibal | |
| 7,299,186 B2 | 11/2007 | Kuzunuki | |
| 7,301,093 B2 | 11/2007 | Sater | |
| 7,305,381 B1 | 12/2007 | Poppink | |
| 7,321,850 B2 | 1/2008 | Wakita | |
| 7,328,155 B2 | 2/2008 | Endo | |
| 7,337,116 B2 | 2/2008 | Charlesworth | |
| 7,340,040 B1 | 3/2008 | Saylor | |
| 7,366,285 B2 | 4/2008 | Parolkar | |
| 7,366,669 B2 | 4/2008 | Nishitani | |
| 7,376,586 B1 | 5/2008 | Partovi | |
| 7,376,645 B2 | 5/2008 | Bernard | |
| 7,380,250 B2 | 5/2008 | Schechter | |
| 7,386,443 B1 | 6/2008 | Parthasarathy | |
| 7,398,209 B2 | 7/2008 | Kennewick | |
| 7,406,421 B2 | 7/2008 | Odinak | |
| 7,415,100 B2 | 8/2008 | Cooper | |
| 7,415,414 B2 | 8/2008 | Azara | |
| 7,421,393 B1 | 9/2008 | DiFabbrizio | |
| 7,424,431 B2 | 9/2008 | Greene | |
| 7,447,635 B1 | 11/2008 | Konopka | |
| 7,451,088 B1 | 11/2008 | Ehlen | |
| 7,454,368 B2 | 11/2008 | Stillman | |
| 7,454,608 B2 | 11/2008 | Gopalakrishnan | |
| 7,461,059 B2 | 12/2008 | Richardson | |
| 7,472,020 B2 | 12/2008 | Brulle-Drews | |
| 7,472,060 B1 | 12/2008 | Gorin | |
| 7,472,075 B2 | 12/2008 | Odinak | |
| 7,477,909 B2 | 1/2009 | Roth | |
| 7,478,036 B2 | 1/2009 | Shen | |
| 7,487,088 B1 | 2/2009 | Gorin | |
| 7,487,110 B2 | 2/2009 | Bennett | |
| 7,493,259 B2 | 2/2009 | Jones | |
| 7,493,559 B1 | 2/2009 | Wolff | |
| 7,502,672 B1 | 3/2009 | Kolls | |
| 7,502,730 B2 | 3/2009 | Wang | |
| 7,502,738 B2 | 3/2009 | Kennewick | |
| 7,512,906 B1 | 3/2009 | Baier | |
| 7,516,076 B2 | 4/2009 | Walker | |
| 7,529,675 B2 | 5/2009 | Maes | |
| 7,536,297 B2 | 5/2009 | Byrd | |
| 7,536,374 B2 | 5/2009 | Au | |
| 7,542,894 B2 | 6/2009 | Murata | |
| 7,546,382 B2 | 6/2009 | Healey | |
| 7,548,491 B2 | 6/2009 | Macfarlane | |
| 7,552,054 B1 | 6/2009 | Stifelman | |
| 7,558,730 B2 | 7/2009 | Davis | |
| 7,574,362 B2 | 8/2009 | Walker | |
| 7,577,244 B2 | 8/2009 | Taschereau | |
| 7,606,708 B2 | 10/2009 | Hwang | |
| 7,606,712 B1 | 10/2009 | Smith | |
| 7,620,549 B2 | 11/2009 | DiCristo | |
| 7,634,409 B2 | 12/2009 | Kennewick | |
| 7,640,006 B2 | 12/2009 | Portman | |
| 7,640,160 B2 | 12/2009 | DiCristo | |
| 7,640,272 B2 | 12/2009 | Mahajan | |
| 7,672,931 B2 | 3/2010 | Hurst-Hiller | |
| 7,676,365 B2 | 3/2010 | Hwang | |
| 7,676,369 B2 | 3/2010 | Fujimoto | |
| 7,684,977 B2 | 3/2010 | Morikawa | |

(56) References Cited

U.S. PATENT DOCUMENTS

| | | |
|---|---|---|
| 7,693,720 B2 | 4/2010 | Kennewick |
| 7,697,673 B2 | 4/2010 | Chiu |
| 7,706,616 B2 | 4/2010 | Kristensson |
| 7,729,913 B1 | 6/2010 | Lee |
| 7,729,916 B2 | 6/2010 | Coffman |
| 7,729,918 B2 | 6/2010 | Walker |
| 7,729,920 B2 | 6/2010 | Chaar |
| 7,734,287 B2 | 6/2010 | Ying |
| 7,748,021 B2 | 6/2010 | Obradovich |
| 7,774,333 B2 | 8/2010 | Colledge |
| 7,788,084 B2 | 8/2010 | Brun |
| 7,792,257 B1 | 9/2010 | Vanier |
| 7,801,731 B2 | 9/2010 | Odinak |
| 7,809,570 B2 | 10/2010 | Kennewick |
| 7,818,176 B2 | 10/2010 | Freeman |
| 7,831,426 B2 | 11/2010 | Bennett |
| 7,831,433 B1 | 11/2010 | Belvin |
| 7,856,358 B2 | 12/2010 | Ho |
| 7,873,519 B2 | 1/2011 | Bennett |
| 7,873,523 B2 | 1/2011 | Potter |
| 7,873,654 B2 | 1/2011 | Bernard |
| 7,881,936 B2 | 2/2011 | Longe |
| 7,890,324 B2 | 2/2011 | Bangalore |
| 7,894,849 B2 | 2/2011 | Kass |
| 2,902,969 A1 | 3/2011 | Obradovich |
| 7,917,367 B2 | 3/2011 | DiCristo |
| 7,920,682 B2 | 4/2011 | Byrne |
| 7,949,529 B2 | 5/2011 | Weider |
| 7,949,537 B2 | 5/2011 | Walker |
| 7,953,732 B2 | 5/2011 | Frank |
| 7,974,875 B1 | 7/2011 | Quilici |
| 7,983,917 B2 | 7/2011 | Kennewick |
| 7,984,287 B2 | 7/2011 | Gopalakrishnan |
| 8,005,683 B2 | 8/2011 | Tessel |
| 8,015,006 B2 | 9/2011 | Kennewick |
| 8,024,186 B1 | 9/2011 | De Bonet |
| 8,027,965 B2 | 9/2011 | Takehara |
| 8,032,383 B1 | 10/2011 | Bhardwaj |
| 8,060,367 B2 | 11/2011 | Keaveney |
| 8,069,046 B2 | 11/2011 | Kennewick |
| 8,073,681 B2 | 12/2011 | Baldwin |
| 8,077,975 B2 | 12/2011 | Ma |
| 8,078,502 B2 * | 12/2011 | Hao ............... G06Q 30/0641 705/26.61 |
| 8,082,153 B2 | 12/2011 | Coffman |
| 8,086,463 B2 | 12/2011 | Ativanichayaphong |
| 8,103,510 B2 | 1/2012 | Sato |
| 8,112,275 B2 | 2/2012 | Kennewick |
| 8,140,327 B2 | 3/2012 | Kennewick |
| 8,140,335 B2 | 3/2012 | Kennewick |
| 8,145,489 B2 | 3/2012 | Freeman |
| 8,150,694 B2 | 4/2012 | Kennewick |
| 8,155,962 B2 | 4/2012 | Kennewick |
| 8,170,867 B2 | 5/2012 | Germain |
| 8,180,037 B1 | 5/2012 | Delker |
| 8,190,436 B2 | 5/2012 | Bangalore |
| 8,195,468 B2 | 6/2012 | Weider |
| 8,200,485 B1 | 6/2012 | Lee |
| 8,204,751 B1 | 6/2012 | Di Fabbrizio |
| 8,219,399 B2 | 7/2012 | Lutz |
| 8,219,599 B2 | 7/2012 | Tunstall-Pedoe |
| 8,224,652 B2 | 7/2012 | Wang |
| 8,255,224 B2 | 8/2012 | Singleton |
| 8,326,599 B2 | 12/2012 | Tomeh |
| 8,326,627 B2 | 12/2012 | Kennewick |
| 8,326,634 B2 | 12/2012 | DiCristo |
| 8,326,637 B2 | 12/2012 | Baldwin |
| 8,332,224 B2 | 12/2012 | DiCristo |
| 8,340,975 B1 | 12/2012 | Rosenberger |
| 8,346,563 B1 | 1/2013 | Hjelm |
| 8,370,147 B2 | 2/2013 | Kennewick |
| 8,447,607 B2 | 5/2013 | Weider |
| 8,447,651 B1 | 5/2013 | Scholl |
| 8,452,598 B2 | 5/2013 | Kennewick |
| 8,503,995 B2 | 8/2013 | Ramer |
| 8,509,403 B2 | 8/2013 | Chiu |
| 8,515,765 B2 | 8/2013 | Baldwin |
| 8,527,274 B2 | 9/2013 | Freeman |
| 8,577,671 B1 | 11/2013 | Barve |
| 8,589,161 B2 | 11/2013 | Kennewick |
| 8,612,205 B2 | 12/2013 | Hanneman |
| 8,612,206 B2 | 12/2013 | Chalabi |
| 8,620,659 B2 | 12/2013 | DiCristo |
| 8,719,005 B1 | 5/2014 | Lee |
| 8,719,009 B2 | 5/2014 | Baldwin |
| 8,719,026 B2 | 5/2014 | Kennewick |
| 8,731,929 B2 | 5/2014 | Kennewick |
| 8,738,380 B2 | 5/2014 | Baldwin |
| 8,849,652 B2 | 9/2014 | Weider |
| 8,849,670 B2 | 9/2014 | DiCristo |
| 8,849,696 B2 | 9/2014 | Pansari |
| 8,849,791 B1 | 9/2014 | Hertschuh |
| 8,886,536 B2 | 11/2014 | Freeman |
| 8,972,243 B1 | 3/2015 | Strom |
| 8,972,354 B1 | 3/2015 | Telang |
| 8,983,839 B2 | 3/2015 | Kennewick |
| 9,009,046 B1 | 4/2015 | Stewart |
| 9,015,049 B2 | 4/2015 | Baldwin |
| 9,037,455 B1 | 5/2015 | Faaborg |
| 9,070,366 B1 | 6/2015 | Mathias |
| 9,070,367 B1 | 6/2015 | Hoffmeister |
| 9,105,266 B2 | 8/2015 | Baldwin |
| 9,171,541 B2 | 10/2015 | Kennewick |
| 9,269,097 B2 | 2/2016 | Freeman |
| 9,305,548 B2 | 4/2016 | Kennewick |
| 9,308,445 B1 | 4/2016 | Merzenich |
| 9,318,108 B2 | 4/2016 | Gruber |
| 9,406,078 B2 | 8/2016 | Freeman |
| 9,443,514 B1 | 9/2016 | Taubman |
| 9,502,025 B2 | 11/2016 | Kennewick |
| 9,626,703 B2 | 4/2017 | Kennewick, Sr. |
| 9,711,143 B2 | 7/2017 | Kennewick |
| 10,089,984 B2 | 10/2018 | Kennewick |
| 2001/0011336 A1 | 8/2001 | Sitka |
| 2001/0014857 A1 | 8/2001 | Wang |
| 2001/0021905 A1 | 9/2001 | Burnett |
| 2001/0039492 A1 | 11/2001 | Nemoto |
| 2001/0041980 A1 | 11/2001 | Howard |
| 2001/0047261 A1 | 11/2001 | Kassan |
| 2001/0049601 A1 | 12/2001 | Kroeker |
| 2001/0054087 A1 | 12/2001 | Flom |
| 2002/0002548 A1 | 1/2002 | Roundtree |
| 2002/0007267 A1 | 1/2002 | Batchilo |
| 2002/0010584 A1 | 1/2002 | Schultz |
| 2002/0015500 A1 | 2/2002 | Belt |
| 2002/0022927 A1 | 2/2002 | Lemelson |
| 2002/0022956 A1 | 2/2002 | Ukrainczyk |
| 2002/0029186 A1 | 3/2002 | Roth |
| 2002/0029261 A1 | 3/2002 | Shibata |
| 2002/0032752 A1 | 3/2002 | Gold |
| 2002/0035501 A1 | 3/2002 | Handel |
| 2002/0040297 A1 | 4/2002 | Tsiao |
| 2002/0049535 A1 | 4/2002 | Rigo |
| 2002/0049805 A1 | 4/2002 | Yamada |
| 2002/0059068 A1 | 5/2002 | Rose |
| 2002/0065568 A1 | 5/2002 | Silfvast |
| 2002/0067839 A1 | 6/2002 | Heinrich |
| 2002/0069059 A1 | 6/2002 | Smith |
| 2002/0069071 A1 | 6/2002 | Knockeart |
| 2002/0073176 A1 | 6/2002 | Ikeda |
| 2002/0082911 A1 | 6/2002 | Dunn |
| 2002/0087312 A1 | 7/2002 | Lee |
| 2002/0087326 A1 | 7/2002 | Lee |
| 2002/0087525 A1 | 7/2002 | Abbott |
| 2002/0107694 A1 | 8/2002 | Lerg |
| 2002/0120609 A1 | 8/2002 | Lang |
| 2002/0124050 A1 | 9/2002 | Middeljans |
| 2002/0133347 A1 | 9/2002 | Schoneburg |
| 2002/0133354 A1 | 9/2002 | Ross |
| 2002/0133402 A1 | 9/2002 | Faber |
| 2002/0135618 A1 | 9/2002 | Maes |
| 2002/0138248 A1 | 9/2002 | Corston-Oliver |
| 2002/0143532 A1 | 10/2002 | McLean |
| 2002/0143535 A1 | 10/2002 | Kist |

(56) References Cited

U.S. PATENT DOCUMENTS

| | | |
|---|---|---|
| 2002/0152260 A1 | 10/2002 | Chen |
| 2002/0161646 A1 | 10/2002 | Gailey |
| 2002/0161647 A1 | 10/2002 | Galley |
| 2002/0169597 A1 | 11/2002 | Fain |
| 2002/0173333 A1 | 11/2002 | Buchholz |
| 2002/0173961 A1 | 11/2002 | Guerra |
| 2002/0178003 A1 | 11/2002 | Gehrke |
| 2002/0184373 A1 | 12/2002 | Maes |
| 2002/0188455 A1 | 12/2002 | Shioda |
| 2002/0188602 A1 | 12/2002 | Stubler |
| 2002/0198714 A1 | 12/2002 | Zhou |
| 2003/0005033 A1 | 1/2003 | Mohan |
| 2003/0014261 A1 | 1/2003 | Kageyama |
| 2003/0016835 A1 | 1/2003 | Elko |
| 2003/0036903 A1 | 2/2003 | Konopka |
| 2003/0046071 A1 | 3/2003 | Wyman |
| 2003/0046281 A1 | 3/2003 | Son |
| 2003/0046346 A1 | 3/2003 | Mumick |
| 2003/0064709 A1 | 4/2003 | Galley |
| 2003/0065427 A1 | 4/2003 | Funk |
| 2003/0069734 A1 | 4/2003 | Everhart |
| 2003/0069880 A1 | 4/2003 | Harrison |
| 2003/0088421 A1 | 5/2003 | Maes |
| 2003/0093419 A1 | 5/2003 | Bangalore |
| 2003/0097249 A1 | 5/2003 | Walker |
| 2003/0110037 A1 | 6/2003 | Walker |
| 2003/0112267 A1 | 6/2003 | Belrose |
| 2003/0115062 A1 | 6/2003 | Walker |
| 2003/0120493 A1 | 6/2003 | Gupta |
| 2003/0135488 A1 | 7/2003 | Amir |
| 2003/0144846 A1 | 7/2003 | Denenberg |
| 2003/0154082 A1 | 8/2003 | Toguri |
| 2003/0158731 A1 | 8/2003 | Falcon |
| 2003/0161448 A1 | 8/2003 | Parolkar |
| 2003/0167167 A1 | 9/2003 | Gong |
| 2003/0174155 A1 | 9/2003 | Weng |
| 2003/0182123 A1 | 9/2003 | Mitsuyoshi |
| 2003/0182132 A1 | 9/2003 | Niemoeller |
| 2003/0187643 A1 | 10/2003 | VanThong |
| 2003/0204492 A1 | 10/2003 | Wolf |
| 2003/0206640 A1 | 11/2003 | Malvar |
| 2003/0212550 A1 | 11/2003 | Ubale |
| 2003/0212558 A1 | 11/2003 | Matula |
| 2003/0212562 A1 | 11/2003 | Patel |
| 2003/0216919 A1 | 11/2003 | Roushar |
| 2003/0225825 A1 | 12/2003 | Healey |
| 2003/0233230 A1 | 12/2003 | Ammicht |
| 2003/0236664 A1 | 12/2003 | Sharma |
| 2004/0006475 A1 | 1/2004 | Ehlen |
| 2004/0010358 A1 | 1/2004 | Oesterling |
| 2004/0025115 A1 | 2/2004 | Sienel |
| 2004/0030741 A1 | 2/2004 | Wolton |
| 2004/0036601 A1 | 2/2004 | Obradovich |
| 2004/0044516 A1 | 3/2004 | Kennewick |
| 2004/0093567 A1 | 5/2004 | Schabes |
| 2004/0098245 A1 | 5/2004 | Walker |
| 2004/0102977 A1 | 5/2004 | Metzler |
| 2004/0117179 A1 | 6/2004 | Balasuriya |
| 2004/0117804 A1 | 6/2004 | Scahill |
| 2004/0122673 A1 | 6/2004 | Park |
| 2004/0122674 A1 | 6/2004 | Bangalore |
| 2004/0128514 A1 | 7/2004 | Rhoads |
| 2004/0133793 A1 | 7/2004 | Ginter |
| 2004/0140989 A1 | 7/2004 | Papageorge |
| 2004/0143440 A1 | 7/2004 | Prasad |
| 2004/0148154 A1 | 7/2004 | Acero |
| 2004/0148170 A1 | 7/2004 | Acero |
| 2004/0158555 A1 | 8/2004 | Seedman |
| 2004/0166832 A1 | 8/2004 | Portman |
| 2004/0167771 A1 | 8/2004 | Duan |
| 2004/0172247 A1 | 9/2004 | Yoon |
| 2004/0172258 A1 | 9/2004 | Dominach |
| 2004/0189697 A1 | 9/2004 | Fukuoka |
| 2004/0193408 A1 | 9/2004 | Hunt |
| 2004/0193420 A1 | 9/2004 | Kennewick |
| 2004/0199375 A1 | 10/2004 | Ehsani |
| 2004/0199387 A1 | 10/2004 | Wang |
| 2004/0199389 A1 | 10/2004 | Geiger |
| 2004/0201607 A1 | 10/2004 | Mulvey |
| 2004/0204939 A1 | 10/2004 | Liu |
| 2004/0205671 A1 | 10/2004 | Sukehiro |
| 2004/0220800 A1 | 11/2004 | Kong |
| 2004/0243393 A1 | 12/2004 | Wang |
| 2004/0243417 A9 | 12/2004 | Pitts |
| 2004/0247092 A1 | 12/2004 | Timmins |
| 2004/0249636 A1 | 12/2004 | Applebaum |
| 2005/0015256 A1 | 1/2005 | Kargman |
| 2005/0021331 A1 | 1/2005 | Huang |
| 2005/0021334 A1 | 1/2005 | Iwahashi |
| 2005/0021470 A1 | 1/2005 | Martin |
| 2005/0021826 A1 | 1/2005 | Kumar |
| 2005/0033574 A1 | 2/2005 | Kim |
| 2005/0033582 A1 | 2/2005 | Gadd |
| 2005/0043940 A1 | 2/2005 | Elder |
| 2005/0043956 A1 | 2/2005 | Aoyama |
| 2005/0060142 A1 | 3/2005 | Visser |
| 2005/0080632 A1 | 4/2005 | Endo |
| 2005/0080821 A1 | 4/2005 | Breil |
| 2005/0102282 A1 | 5/2005 | Linden |
| 2005/0114116 A1 | 5/2005 | Fiedler |
| 2005/0125232 A1 | 6/2005 | Gadd |
| 2005/0131673 A1 | 6/2005 | Koizumi |
| 2005/0137850 A1 | 6/2005 | Odell |
| 2005/0137877 A1 | 6/2005 | Oesterling |
| 2005/0138168 A1 | 6/2005 | Hoffman |
| 2005/0143994 A1 | 6/2005 | Mori |
| 2005/0144013 A1 | 6/2005 | Fujimoto |
| 2005/0144187 A1 | 6/2005 | Che |
| 2005/0149319 A1 | 7/2005 | Honda |
| 2005/0169441 A1 | 8/2005 | Yacoub |
| 2005/0216254 A1 | 9/2005 | Gupta |
| 2005/0222763 A1 | 10/2005 | Uyeki |
| 2005/0234637 A1 | 10/2005 | Obradovich |
| 2005/0234727 A1 | 10/2005 | Chiu |
| 2005/0240412 A1 | 10/2005 | Fujita |
| 2005/0246174 A1 | 11/2005 | DeGolia |
| 2005/0283364 A1 | 12/2005 | Longe |
| 2005/0283532 A1 | 12/2005 | Kim |
| 2005/0283752 A1 | 12/2005 | Fruchter |
| 2006/0041431 A1 | 2/2006 | Maes |
| 2006/0046740 A1 | 3/2006 | Johnson |
| 2006/0047509 A1 | 3/2006 | Ding |
| 2006/0072738 A1 | 4/2006 | Louis |
| 2006/0074670 A1 | 4/2006 | Weng |
| 2006/0074671 A1 | 4/2006 | Farmaner |
| 2006/0080098 A1 | 4/2006 | Campbell |
| 2006/0100851 A1 | 5/2006 | Schonebeck |
| 2006/0106769 A1 | 5/2006 | Gibbs |
| 2006/0129409 A1 | 6/2006 | Mizutani |
| 2006/0130002 A1 | 6/2006 | Hirayama |
| 2006/0149633 A1 | 7/2006 | Voisin |
| 2006/0182085 A1 | 8/2006 | Sweeney |
| 2006/0206310 A1 | 9/2006 | Ravikumar |
| 2006/0217133 A1 | 9/2006 | Christenson |
| 2006/0236343 A1 | 10/2006 | Chang |
| 2006/0242017 A1 | 10/2006 | Libes |
| 2006/0247919 A1 | 11/2006 | Specht |
| 2006/0253247 A1 | 11/2006 | de Silva |
| 2006/0253281 A1 | 11/2006 | Letzt |
| 2006/0285662 A1 | 12/2006 | Yin |
| 2007/0011159 A1 | 1/2007 | Hillis |
| 2007/0033005 A1 | 2/2007 | Cristo |
| 2007/0033020 A1 | 2/2007 | Francois |
| 2007/0033526 A1 | 2/2007 | Thompson |
| 2007/0038436 A1 | 2/2007 | Cristo |
| 2007/0038445 A1 | 2/2007 | Helbing |
| 2007/0043569 A1 | 2/2007 | Potter |
| 2007/0043574 A1 | 2/2007 | Coffman |
| 2007/0043868 A1 | 2/2007 | Kumar |
| 2007/0050191 A1 | 3/2007 | Weider |
| 2007/0050279 A1 | 3/2007 | Huang |
| 2007/0055525 A1 | 3/2007 | Kennewick |
| 2007/0060114 A1 | 3/2007 | Ramer |
| 2007/0061067 A1 | 3/2007 | Zeinstra |

(56) References Cited

U.S. PATENT DOCUMENTS

| | | |
|---|---|---|
| 2007/0061735 A1 | 3/2007 | Hoffberg |
| 2007/0067310 A1 | 3/2007 | Gupta |
| 2007/0073544 A1 | 3/2007 | Millett |
| 2007/0078708 A1 | 4/2007 | Yu |
| 2007/0078709 A1 | 4/2007 | Rajaram |
| 2007/0078814 A1 | 4/2007 | Flowers |
| 2007/0094003 A1 | 4/2007 | Huang |
| 2007/0100797 A1 | 5/2007 | Thun |
| 2007/0106499 A1 | 5/2007 | Dahlgren |
| 2007/0112555 A1 | 5/2007 | Lavi |
| 2007/0112630 A1 | 5/2007 | Lau |
| 2007/0118357 A1 | 5/2007 | Kasravi |
| 2007/0124057 A1 | 5/2007 | Prieto |
| 2007/0135101 A1 | 6/2007 | Ramati |
| 2007/0146833 A1 | 6/2007 | Satomi |
| 2007/0162296 A1 | 7/2007 | Altberg |
| 2007/0174258 A1 | 7/2007 | Jones |
| 2007/0179778 A1 | 8/2007 | Gong |
| 2007/0185859 A1 | 8/2007 | Flowers |
| 2007/0186165 A1 | 8/2007 | Maislos |
| 2007/0192309 A1 | 8/2007 | Fischer |
| 2007/0198267 A1 | 8/2007 | Jones |
| 2007/0203699 A1 | 8/2007 | Nagashima |
| 2007/0203736 A1 | 8/2007 | Ashton |
| 2007/0208732 A1 | 9/2007 | Flowers |
| 2007/0214182 A1 | 9/2007 | Rosenberg |
| 2007/0250901 A1 | 10/2007 | McIntire |
| 2007/0265850 A1 | 11/2007 | Kennewick |
| 2007/0266257 A1 | 11/2007 | Camaisa |
| 2007/0276651 A1 | 11/2007 | Bliss |
| 2007/0294615 A1 | 12/2007 | Sathe |
| 2007/0299824 A1 | 12/2007 | Pan |
| 2008/0010135 A1 | 1/2008 | Schrock |
| 2008/0014908 A1 | 1/2008 | Vasant |
| 2008/0032622 A1 | 2/2008 | Kopra |
| 2008/0034032 A1 | 2/2008 | Healey |
| 2008/0046311 A1 | 2/2008 | Shahine |
| 2008/0059188 A1 | 3/2008 | Konopka |
| 2008/0065386 A1 | 3/2008 | Cross |
| 2008/0065389 A1 | 3/2008 | Cross |
| 2008/0065390 A1 | 3/2008 | Ativanichayaphong |
| 2008/0086455 A1 | 4/2008 | Meisels |
| 2008/0091406 A1 | 4/2008 | Baldwin |
| 2008/0103761 A1 | 5/2008 | Printz |
| 2008/0103781 A1 | 5/2008 | Wasson |
| 2008/0104071 A1 | 5/2008 | Pragada |
| 2008/0109285 A1 | 5/2008 | Reuther |
| 2008/0115163 A1 | 5/2008 | Gilboa |
| 2008/0126091 A1 | 5/2008 | Clark |
| 2008/0126284 A1 | 5/2008 | Forbes |
| 2008/0133215 A1 | 6/2008 | Sarukkai |
| 2008/0140385 A1 | 6/2008 | Mahajan |
| 2008/0147396 A1 | 6/2008 | Wang |
| 2008/0147410 A1 | 6/2008 | Odinak |
| 2008/0147637 A1 | 6/2008 | Li |
| 2008/0154604 A1 | 6/2008 | Sathish |
| 2008/0162471 A1 | 7/2008 | Bernard |
| 2008/0177530 A1 | 7/2008 | Cross |
| 2008/0184164 A1 | 7/2008 | Di Fabbrizio |
| 2008/0189110 A1 | 8/2008 | Freeman |
| 2008/0189187 A1 | 8/2008 | Hao |
| 2008/0228496 A1 | 9/2008 | Yu |
| 2008/0235023 A1 | 9/2008 | Kennewick |
| 2008/0235027 A1 | 9/2008 | Cross |
| 2008/0269958 A1 | 10/2008 | Filev |
| 2008/0270135 A1 | 10/2008 | Goel |
| 2008/0270224 A1 | 10/2008 | Portman |
| 2008/0294437 A1 | 11/2008 | Nakano |
| 2008/0294994 A1 | 11/2008 | Kruger |
| 2008/0306743 A1 | 12/2008 | Di Fabbrizio |
| 2008/0319751 A1 | 12/2008 | Kennewick |
| 2009/0006077 A1 | 1/2009 | Keaveney |
| 2009/0006194 A1 | 1/2009 | Sridharan |
| 2009/0018829 A1 | 1/2009 | Kuperstein |
| 2009/0024476 A1 | 1/2009 | Baar |
| 2009/0030686 A1 | 1/2009 | Weng |
| 2009/0052635 A1 | 2/2009 | Jones |
| 2009/0055176 A1 | 2/2009 | Hu |
| 2009/0067599 A1 | 3/2009 | Agarwal |
| 2009/0076827 A1 | 3/2009 | Bulitta |
| 2009/0106029 A1 | 4/2009 | DeLine |
| 2009/0117885 A1 | 5/2009 | Roth |
| 2009/0144131 A1 | 6/2009 | Chiu |
| 2009/0144271 A1 | 6/2009 | Richardson |
| 2009/0150156 A1 | 6/2009 | Kennewick |
| 2009/0157382 A1 | 6/2009 | Bar |
| 2009/0164216 A1 | 6/2009 | Chengalvarayan |
| 2009/0171664 A1 | 7/2009 | Kennewick |
| 2009/0171912 A1 | 7/2009 | Nash |
| 2009/0197582 A1 | 8/2009 | Lewis |
| 2009/0216540 A1 | 8/2009 | Tessel |
| 2009/0248565 A1 | 10/2009 | Chuang |
| 2009/0248605 A1 | 10/2009 | Mitchell |
| 2009/0259561 A1* | 10/2009 | Boys ............... G06Q 30/06 705/26.1 |
| 2009/0259646 A1 | 10/2009 | Fujita |
| 2009/0265163 A1 | 10/2009 | Li |
| 2009/0271194 A1 | 10/2009 | Davis |
| 2009/0273563 A1 | 11/2009 | Pryor |
| 2009/0276700 A1 | 11/2009 | Anderson |
| 2009/0287680 A1 | 11/2009 | Paek |
| 2009/0299745 A1 | 12/2009 | Kennewick |
| 2009/0299857 A1 | 12/2009 | Brubaker |
| 2009/0304161 A1 | 12/2009 | Pettyjohn |
| 2009/0307031 A1 | 12/2009 | Winkler |
| 2009/0313026 A1 | 12/2009 | Coffman |
| 2009/0319517 A1 | 12/2009 | Guha |
| 2010/0023320 A1 | 1/2010 | Cristo |
| 2010/0023331 A1 | 1/2010 | Duta |
| 2010/0029261 A1 | 2/2010 | Mikkelsen |
| 2010/0036967 A1 | 2/2010 | Caine |
| 2010/0049501 A1 | 2/2010 | Kennewick |
| 2010/0049514 A1 | 2/2010 | Kennewick |
| 2010/0057443 A1 | 3/2010 | Cristo |
| 2010/0063880 A1 | 3/2010 | Atsmon |
| 2010/0064025 A1 | 3/2010 | Nelimarkka |
| 2010/0076778 A1 | 3/2010 | Kondrk |
| 2010/0094707 A1 | 4/2010 | Freer |
| 2010/0138300 A1 | 6/2010 | Wallis |
| 2010/0145700 A1 | 6/2010 | Kennewick |
| 2010/0185512 A1 | 7/2010 | Borger |
| 2010/0191856 A1 | 7/2010 | Gupta |
| 2010/0204986 A1 | 8/2010 | Kennewick |
| 2010/0204994 A1 | 8/2010 | Kennewick |
| 2010/0217604 A1 | 8/2010 | Baldwin |
| 2010/0268536 A1 | 10/2010 | Suendermann |
| 2010/0286985 A1 | 11/2010 | Kennewick |
| 2010/0299142 A1 | 11/2010 | Freeman |
| 2010/0312547 A1 | 12/2010 | Van Os |
| 2010/0312566 A1 | 12/2010 | Odinak |
| 2010/0318357 A1 | 12/2010 | Istvan |
| 2010/0331064 A1 | 12/2010 | Michelstein |
| 2011/0022393 A1 | 1/2011 | Waller |
| 2011/0106527 A1 | 5/2011 | Chiu |
| 2011/0112827 A1 | 5/2011 | Kennewick |
| 2011/0112921 A1 | 5/2011 | Kennewick |
| 2011/0119049 A1 | 5/2011 | Ylonen |
| 2011/0131036 A1 | 6/2011 | DiCristo |
| 2011/0131045 A1 | 6/2011 | Cristo |
| 2011/0231182 A1 | 9/2011 | Weider |
| 2011/0231188 A1 | 9/2011 | Kennewick |
| 2011/0238409 A1 | 9/2011 | Larcheveque |
| 2011/0307167 A1 | 12/2011 | Taschereau |
| 2012/0022857 A1 | 1/2012 | Baldwin |
| 2012/0041753 A1 | 2/2012 | Dymetman |
| 2012/0046935 A1 | 2/2012 | Nagao |
| 2012/0101809 A1 | 4/2012 | Kennewick |
| 2012/0101810 A1 | 4/2012 | Kennewick |
| 2012/0109753 A1 | 5/2012 | Kennewick |
| 2012/0150620 A1 | 6/2012 | Mandyam |
| 2012/0150636 A1 | 6/2012 | Freeman |
| 2012/0239498 A1 | 9/2012 | Ramer |
| 2012/0240060 A1 | 9/2012 | Pennington |
| 2012/0265528 A1 | 10/2012 | Gruber |

(56) References Cited

U.S. PATENT DOCUMENTS

| | | | |
|---|---|---|---|
| 2012/0278073 A1 | 11/2012 | Weider | |
| 2013/0006734 A1 | 1/2013 | Ocko | |
| 2013/0054228 A1 | 2/2013 | Baldwin | |
| 2013/0060625 A1 | 3/2013 | Davis | |
| 2013/0080177 A1 | 3/2013 | Chen | |
| 2013/0211710 A1 | 8/2013 | Kennewick | |
| 2013/0253929 A1 | 9/2013 | Weider | |
| 2013/0254314 A1 | 9/2013 | Chow | |
| 2013/0297293 A1 | 11/2013 | Cristo | |
| 2013/0304473 A1 | 11/2013 | Baldwin | |
| 2013/0311324 A1 | 11/2013 | Stoll | |
| 2013/0332454 A1 | 12/2013 | Stuhec | |
| 2013/0339022 A1 | 12/2013 | Baldwin | |
| 2014/0006951 A1 | 1/2014 | Hunter | |
| 2014/0012577 A1 | 1/2014 | Freeman | |
| 2014/0025371 A1 | 1/2014 | Min | |
| 2014/0108013 A1 | 4/2014 | Cristo | |
| 2014/0136187 A1 | 5/2014 | Wolverton | |
| 2014/0136259 A1* | 5/2014 | Kinsey, II | G06Q 30/0631 705/7.16 |
| 2014/0156278 A1 | 6/2014 | Kennewick | |
| 2014/0195238 A1 | 7/2014 | Terao | |
| 2014/0236575 A1 | 8/2014 | Tur | |
| 2014/0249821 A1 | 9/2014 | Kennewick | |
| 2014/0249822 A1 | 9/2014 | Baldwin | |
| 2014/0278413 A1 | 9/2014 | Pitschel | |
| 2014/0278416 A1 | 9/2014 | Schuster | |
| 2014/0288934 A1 | 9/2014 | Kennewick | |
| 2014/0330552 A1 | 11/2014 | Bangalore | |
| 2014/0337007 A1 | 11/2014 | Waibel | |
| 2014/0365222 A1 | 12/2014 | Weider | |
| 2015/0019211 A1 | 1/2015 | Simard | |
| 2015/0019217 A1 | 1/2015 | Cristo | |
| 2015/0019227 A1 | 1/2015 | Anandarajah | |
| 2015/0066479 A1 | 3/2015 | Pasupalak | |
| 2015/0066627 A1 | 3/2015 | Freeman | |
| 2015/0073910 A1 | 3/2015 | Kennewick | |
| 2015/0095159 A1 | 4/2015 | Kennewick | |
| 2015/0142447 A1 | 5/2015 | Kennewick | |
| 2015/0170641 A1 | 6/2015 | Kennewick | |
| 2015/0193379 A1 | 7/2015 | Mehta | |
| 2015/0199339 A1 | 7/2015 | Mirkin | |
| 2015/0228276 A1 | 8/2015 | Baldwin | |
| 2015/0293917 A1 | 10/2015 | Bufe | |
| 2015/0348544 A1 | 12/2015 | Baldwin | |
| 2015/0348551 A1 | 12/2015 | Gruber | |
| 2015/0364133 A1 | 12/2015 | Freeman | |
| 2016/0049152 A1 | 2/2016 | Kennewick | |
| 2016/0078482 A1 | 3/2016 | Kennewick | |
| 2016/0078491 A1 | 3/2016 | Kennewick | |
| 2016/0078504 A1 | 3/2016 | Kennewick | |
| 2016/0078773 A1 | 3/2016 | Carter | |
| 2016/0110347 A1 | 4/2016 | Kennewick | |
| 2016/0148610 A1 | 5/2016 | Kennewick | |
| 2016/0148612 A1 | 5/2016 | Guo | |
| 2016/0188292 A1 | 6/2016 | Carter | |
| 2016/0188573 A1 | 6/2016 | Tang | |
| 2016/0217785 A1 | 7/2016 | Kennewick | |
| 2016/0335676 A1 | 11/2016 | Freeman | |
| 2017/0004588 A1 | 1/2017 | Isaacson | |

FOREIGN PATENT DOCUMENTS

| | | |
|---|---|---|
| CN | 101236635 A | 8/2008 |
| CN | 103229206 A | 7/2013 |
| EP | 1320043 A2 | 6/2003 |
| EP | 1646037 | 4/2006 |
| FR | 2867583 | 9/2005 |
| JP | H08263258 | 10/1996 |
| JP | H11249773 | 9/1999 |
| JP | 2001071289 | 3/2001 |
| JP | 2002297626 | 10/2002 |
| JP | 2006146881 | 6/2006 |
| JP | 2008027454 | 2/2008 |
| JP | 2008058465 | 3/2008 |
| JP | 2008139928 | 6/2008 |
| JP | 2011504304 | 2/2011 |
| JP | 2012518847 | 8/2012 |
| WO | 9946763 | 9/1999 |
| WO | 0021232 | 4/2000 |
| WO | 0046792 | 8/2000 |
| WO | 0129742 | 4/2001 |
| WO | 0129742 A2 | 4/2001 |
| WO | 0171609 A2 | 9/2001 |
| WO | 0178065 | 10/2001 |
| WO | 2004072954 | 8/2004 |
| WO | 2005010702 A2 | 2/2005 |
| WO | 2007019318 | 1/2007 |
| WO | 2007021587 | 1/2007 |
| WO | 2007027546 | 1/2007 |
| WO | 2007027989 | 1/2007 |
| WO | 2008098039 | 1/2008 |
| WO | 2008118195 | 1/2008 |
| WO | 2009075912 | 1/2009 |
| WO | 2009145796 | 1/2009 |
| WO | 2009111721 | 9/2009 |
| WO | 2010096752 | 1/2010 |
| WO | 2016044290 | 3/2016 |
| WO | 2016044316 | 3/2016 |
| WO | 2016044319 | 3/2016 |
| WO | 2016044321 | 3/2016 |
| WO | 2016061309 | 4/2016 |

OTHER PUBLICATIONS

"Statement in Accordance with the Notice from the European Patent Office" dated Oct. 1, 2007 Concerning Business Methods (OJ EPO Nov. 2007, 592-593), XP002456252.

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.

Bazzi, Issam et al., "Heterogeneous Lexical Units for Automatic Speech Recognition: Preliminary Investigations", Proceedings of the IEEE International Conference on Acoustics, Speech, and Signal Processing, vol. 3, Jun. 5-9, 2000, XP010507574, pp. 1257-1260.

Belvin, Robert, et al., "Development of the HRL Route Navigation Dialogue System", Proceedings of the First International Conference on Human Language Technology Research, San Diego, 2001, pp. 1-5.

Chai et al., "MIND: A Semantics-Based Multimodal Interpretation Framework for Conversational Systems", Proceedings of the International CLASS Workshop on Natural, Intelligent and Effective Interaction in Multimodal Dialogue Systems, Jun. 2002, pp. 37-46.

Cheyer et al., "Multimodal Maps: An Agent-Based Approach", International Conference on Cooperative Multimodal Communication (CMC/95), May 24-26, 1995, pp. 111-121.

Davis, Z., et al., A Personal Handheld Multi-Modal Shopping Assistant, IEEE, 2006, 9 pages.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Elio et al., "On Abstract Task Models and Conversation Policies" in Workshop on Specifying and Implementing Conversation Policies, Autonomous Agents '99, Seattle, 1999, 10 pages.

Kirchhoff, Katrin, "Syllable-Level Desynchronisation of Phonetic Features for Speech Recognition", Proceedings of the Fourth International Conference on Spoken Language, 1996, ICSLP 96, vol. 4, IEEE, 1996, 3 pages.

Kuhn, Thomas, et al., "Hybrid In-Car Speech Recognition for Mobie Multimedia Applications", Vehicular Technology Conference, IEEE, Jul. 1999, pp. 2009-2013.

Lin, Bor-shen, et al., "A Distributed Architecture for Cooperative Spoken Dialogue Agents with Coherent Dialogue State and History", ASRU'99, 1999, 4 pages.

(56) References Cited

OTHER PUBLICATIONS

Lind, R., et al., "The Network Vehicle—A Glimpse into the Future of Mobile Multi-Media", IEEE Aerosp. Electron. Systems Magazine, vol. 14, No. 9, Sep. 1999, pp. 27-32.
Mao, Mark Z., "Automatic Training Set Segmentation for Multi-Pass Speech Recognition", Department of Electrical Engineering, Stanford University, CA, copyright 2005, IEEE, pp. I-685 to I-688.
O'Shaughnessy, Douglas, "Interacting with Computers by Voice: Automatic Speech Recognition and Synthesis", Proceedings of the IEEE, vol. 91, No. 9, Sep. 1, 2003, XP011100665. pp. 1272-1305.
Reuters, "IBM to Enable Honda Drivers to Talk to Cars", Charles Schwab & Co., Inc., Jul. 28, 2002, 1 page.
Turunen, "Adaptive Interaction Methods in Speech User Interfaces", Conference on Human Factors in Computing Systems; Seattle, Washington, 2001, pp. 91-92.
Vanhoucke, Vincent, "Confidence Scoring and Rejection Using Multi-Pass Speech Recognition", Nuance Communications, Menlo Park, CA, 2005, 4 pages.
Weng, Fuliang, et al., "Efficient Lattice Representation and Generation", Speech Technology and Research Laboratory, SRI International, Menlo Park, CA, 1998, 4 pages.
Wu, Su-Lin, et al., "Incorporating Information from Syllable-Length Time Scales into Automatic Speech Recognition", Proceedings of the 1998 IEEE International Conference on Acoustics, Speech and Signal Processing, 1998, vol. 2, IEEE, 1998, 4 pages.
Wu, Su-Lin, et al., "Integrating Syllable Boundary Information into Speech Recognition", IEEE International Conference on Acoustics, Speech, and Signal Processing, ICASSP-97, 1997, vol. 2, IEEE, 1997, 4 pages.
Zhao, Yilin, "Telematics: Safe and Fun Driving", IEEE Intelligent Systems, vol. 17, Issue 1, 2002, pp. 10-14.
*Amazon.com, Inc., Amazon.com LLC, Amazon Web Services, Inc., A2Z Development Center, Inc. d/b/a/ Lab126, Rawles LLC, Amzn Mobile LLC, Amzn Mobile 2 LLC, Amazon.com Services, Inc. f/k/a Amazon Fulfillment Services, Inc., and Amazon.com Services LLC (formerly Amazon Digital Services LLC) v. VB Assets, LLC*, IPR2020-01346, Decision Granting Institution of Inter Partes Review of U.S. Pat. No. 9,015,049 B2, dated Feb. 4, 2021, 24 pages.
*Amazon.com, Inc., Amazon.com LLC, Amazon Web Services, Inc., A2Z Development Center, Inc. d/b/a/ Lab126, Rawles LLC, Amzn Mobile LLC, Amzn Mobile 2 LLC, Amazon.com Services, Inc. f/k/a Amazon Fulfillment Services, Inc., and Amazon.com Services LLC (formerly Amazon Digital Services LLC) v. VB Assets, LLC*, IPR2020-01367, Decision Granting Institution of Inter Partes Review of U.S. Pat. No. 8,073,681 B2, dated Mar. 11, 2021, 22 pages.
*Amazon.com, Inc., Amazon.com LLC, Amazon Web Services, Inc., A2Z Development Center, Inc. d/b/a/ Lab126, Rawles LLC, Amzn Mobile LLC, Amzn Mobile 2 LLC, Amazon.com Services, Inc. f/k/a Amazon Fulfillment Services, Inc., and Amazon.com Services LLC (formerly Amazon Digital Services LLC) v. VB Assets, LLC*, IPR2020-01374, Decision Denying Institution of Inter Partes Review of U.S. Pat. No. 8,886,536 B2, dated Feb. 4, 2021, 37 pages.
*Amazon.com, Inc., Amazon.com LLC, Amazon Web Services, Inc., A2Z Development Center, Inc. d/b/a/ Lab126, Rawles LLC, Amzn Mobile LLC, Amzn Mobile 2 LLC, Amazon.com Services, Inc. f/k/a Amazon Fulfillment Services, Inc., and Amazon.com Services LLC (formerly Amazon Digital Services LLC) v. VB Assets, LLC*, IPR2020-01377, Decision Denying Institution of Inter Partes Review of U.S. Pat. No. 8,886,536 B2, dated Feb. 4, 2021, 29 pages.
*Amazon.com, Inc., Amazon.com LLC, Amazon Web Services, Inc., A2Z Development Center, Inc. d/b/a/ Lab126, Rawles LLC, Amzn Mobile LLC, Amzn Mobile 2 LLC, Amazon.com Services, Inc. f/k/a Amazon Fulfillment Services, Inc., and Amazon.com Services LLC (formerly Amazon Digital Services LLC) v. VB Assets, LLC*, IPR2020-01380, Decision Denying Institution of Inter Partes Review of U.S. Pat. No. 9,626,703 B2, dated Feb. 4, 2021, 28 pages.
*Amazon.com, Inc., Amazon.com LLC, Amazon Web Services, Inc., A2Z Development Center, Inc. d/b/a/ Lab126, Rawles LLC, Amzn Mobile LLC, Amzn Mobile 2 LLC, Amazon.com Services, Inc. f/k/a Amazon Fulfillment Services, Inc., and Amazon.com Services LLC (formerly Amazon Digital Services LLC) v. VB Assets, LLC*, IPR2020-01381, Decision Denying Institution of Inter Partes Review of U.S. Pat. No. 9,626,703 B2, dated Feb. 4, 2021, 29 pages.
*Amazon.com, Inc., Amazon.com LLC, Amazon Web Services, Inc., A2Z Development Center, Inc. d/b/a/ Lab126, Rawles LLC, Amzn Mobile LLC, Amzn Mobile 2 LLC, Amazon.com Services, Inc. f/k/a Amazon Fulfillment Services, Inc., and Amazon.com Services LLC (formerly Amazon Digital Services LLC) v. VB Assets, LLC*, IPR2020-01388, Decision Denying Institution of Inter Partes Review of U.S. Pat. No. 9,269,097 B2, dated Feb. 24, 2021, 25 pages.
*Amazon.com, Inc., Amazon.com LLC, Amazon Web Services, Inc., A2Z Development Center, Inc. d/b/a/ Lab126, Rawles LLC, Amzn Mobile LLC, Amzn Mobile 2 LLC, Amazon.com Services, Inc. f/k/a Amazon Fulfillment Services, Inc., and Amazon.com Services LLC (formerly Amazon Digital Services LLC) v. VB Assets, LLC*, IPR2020-01390, Decision Denying Institution of Inter Partes Review of U.S. Pat. No. 7,818,176, dated Mar. 11, 2021, 27 pages.
Asthana, A., et al., "A Small Domain Communications System for Personalized Shopping Assistance", Proceedings of 1994 International Conference on Personal Wireless Communications, IEEE Press, Aug. 1994, pp. 199-203.
Huang et al., "Spoken Language Processing: A Guide to Theory, Algorithm, and System Development", Prentice Hall, 2001, 1010 pages.
IEEE 100 The Authoritative Dictionary of IEEE Standards Terms, Seventh Edition, Standards Information Network, IEEE Press, Print ISBN 0-7381-2601-2, Published Dec. 2000, 3 pages.
Lucente, Mark, "Conversational Interfaces for E-Commerce Applications", Communications of the ACM, vol. 43, No. 9, Sep. 2000, pp. 59-61.
Seneff, Stephanie, et al., "Hypothesis Selection and Resolution in the Mercury Flight Reservation System", Spoken Language Systems Group, MIT, 2001, 8 pages.

\* cited by examiner

PROFILE INFORMATION

NAME:
JOHN DOE

DEFAULT PAYMENT INFORMATION:
CREDIT CARD, xxx-xxxx-1234, EX. DATE 12/31/15

DEFAULT SHIPPING INFORMATION:
789 NEW YORK AVE, NEW YORK CITY, NY

PROFILE INFORMATION

PRODUCT CATEGORY:
SHIRTS

PREFERRED RETAIL STORE:
XYZ STORE

PREFERRED BRAND
XYZ BRAND

PREFERRED STYLE:
TRADITIONAL

PREFERRED SIZE
LARGE

PRICE RANGE
$25.00 - $75.00

VOICE COMMERCE

CROSS REFERENCE TO RELATED APPLICATIONS

This application is a continuation of U.S. patent application Ser. No. 15/484,930, filed Apr. 11, 2017, entitled "VOICE COMMERCE", which is a continuation of U.S. patent application Ser. No. 14/855,334, filed Sep. 15, 2015, entitled "VOICE COMMERCE" (now U.S. Pat. No. 9,626,703 issued Apr. 18, 2017), which claims the benefit of U.S. Provisional Patent Application Ser. No. 62/051,273, filed Sep. 16, 2014, entitled "VOICE COMMERCE", all of which are hereby incorporated by reference in their entireties.

FIELD OF THE INVENTION

The invention relates to systems and methods for providing voice commerce. More particularly, the invention relates to systems and methods for preparing and/or completing checkout of product or service purchases via a single utterance.

BACKGROUND OF THE INVENTION

Mobile electronic devices have emerged to become nearly ubiquitous in the everyday lives of many people. One of the reasons for this increased use is the convenience of performing tasks with a mobile electronic device. One task that has seen significant growth is online shopping. During an online shopping session, a user browses a website to locate a product or service for purchase. After the product or service has been located, the user makes payment through the mobile electronic device and has the purchased product or service delivered.

One difficulty in online shopping via a mobile electronic device is that the user must search a website in order to locate a product or service to be purchased and fill out numerous payment and shipping forms to complete checkout (or a purchase transaction). Mobile electronic devices typically contain small screens and keyboards, making it hard for the user to search for the product or service to purchase and input payment and shipping information. While some online shopping applications assist the user in filling out payment and shipping forms, the foregoing applications are often limited to the amount of information that can be provided. Further, some online shopping applications include a "one-click" purchase option. However, this still requires the user to browse the website to locate product or services which they wish to purchase. These and other drawbacks exist.

SUMMARY OF THE INVENTION

The invention relates to systems and methods for preparing and/or completing checkout of product or service purchases via a single utterance. More particularly, the systems and methods may process a single utterance of a user to determine a product or service that is to be purchased, payment information that is to be used to pay for the product or service, shipping information that is to be used to deliver the product or service, and/or other information that is thereafter utilized to prepare and/or complete a purchase transaction for the product or service. In some implementations, the preparation and/or completion of the purchase transaction may be performed without further user input after receipt of the utterance (with which the determination of the product or service, the payment information, or shipping information is based).

In an implementation, the system may receive and process a user input comprising a natural language utterance to determine a product or service to be purchased on behalf of a user. As an example, one or more words associated with the natural language utterance may be indicative of a product or service type, product name, seller name, etc., which can be used to determine the product or service that is to be purchased. Without further user input after the receipt of the user input (or the natural language utterance), the system may obtain payment information that is to be used to pay for the product or service, shipping information that is to be used to deliver the product or service, or other information that is to be used to complete a purchase transaction for the product or service.

In an implementation, upon receipt of a natural language utterance of a user, and without further user input after the receipt of the utterance, the system may process the utterance to determine a product or service, and complete a purchase transaction for the product or service based on payment information associated with the user, shipping information indicating who, where, when, and/or how the product or service is to be delivered, or other information. In a further implementation, after the purchase transaction is completed, the user may be provided with an option to modify one or more aspects related to the product or service purchase (e.g., modify payment information, shipping information, seller from which the product or service is purchased, etc.). As an example, the initial product or service purchase may be cancelled (and result in refund of the payment provided for the completed purchase transaction) in response to the user's modification, and a new purchase transaction may be initiated in accordance with the user's modification. Of course, in some implementations, such after-transaction-completion modifications may be limited to avoid fraud or other issues (e.g., limited to a predefined time period after the transaction completion, limited to certain types of modifications, etc.). In this way, users can experience the convenience of a purchase transaction being completed with reduced actions (e.g., single utterance) without fear of inaccuracies that might be associated with the purchase transaction.

In an implementation, upon receipt of a natural language utterance of a user, and without further user input after the receipt of the utterance, the system may process the utterance to determine a product or service to be purchased, and present a request for user confirmation (or user approval) of the product or service to be purchased, payment information that is to be used to pay for the product or service, shipping information that is to be used to deliver the product or service, or other information that is to be used to complete a purchase transaction for the product or service. Upon receipt of the requested confirmation from the user, a purchase transaction for the product or service may be completed without further user input after the receipt of the requested confirmation. As an example, after the user has provided the utterance, the user may be presented with a prompt that: (i) identifies the product or service, the cost(s) associated with the purchase/delivery of the product or service, the payment information, and the shipping information; and (ii) solicits the user's approval to complete checkout of the product or service using a particular payment method (specified by the payment information to pay for the associated cost(s)), a particular shipping method (specified by the shipping information), along with a name and address (specified by the shipping information) to which the product or service is to be delivered. The user may respond by providing a subsequent natural language utterance. If it is determined (upon receiving and processing the subsequent utterance) that the user provided his/her approval, checkout of the product or service purchase may be completed (e.g., without further user input after receipt of the utterance other than the subsequent utterance). In this way, the confirmation may be used to ensure that that the information utilized to complete checkout of the product or service checkout is accurate and acceptable to the user.

Various other aspects of the invention will be apparent through the detailed description of the invention and the drawings attached hereto. It is also to be understood that both the foregoing general description and the following detailed description are exemplary and not restrictive of the scope of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIGS. 7A and 7B illustrate screenshots of a user interface which facilitates management of profile information, according to an implementation of the invention.

DETAILED DESCRIPTION OF THE INVENTION

In the following description, for the purposes of explanation, numerous specific details are set forth in order to provide a thorough understanding of the implementations of the invention. It will be appreciated, however, by those having skill in the art that the implementations of the invention may be practiced without these specific details or with an equivalent arrangement. In other instances, well-known structures and devices are shown in block diagram form in order to avoid unnecessarily obscuring the implementations of the invention.

Figure 1:
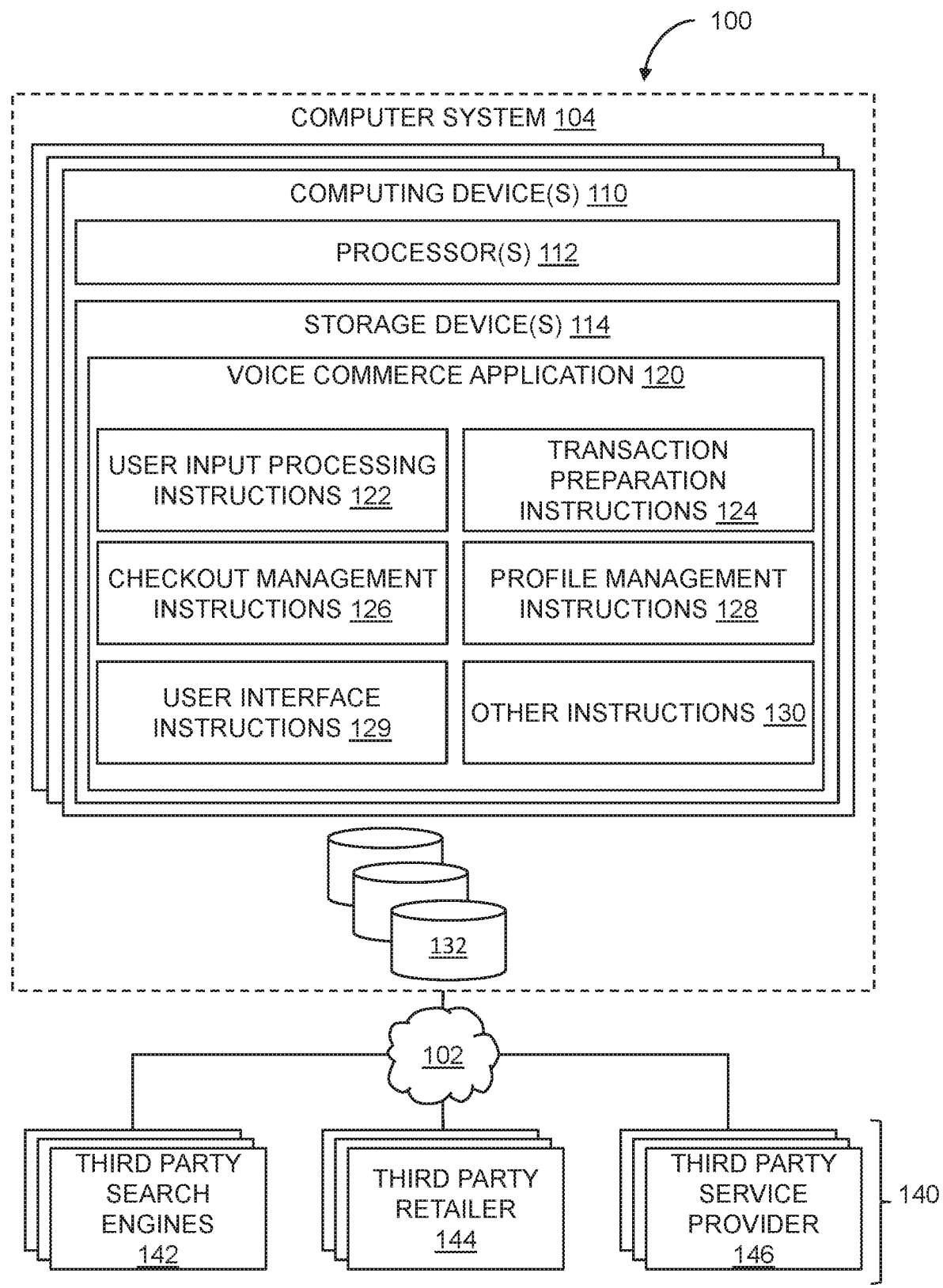
FIG. 1 illustrates a system for providing voice commerce, according to an implementation of the invention.

FIG. 1 illustrates a system 100 for providing voice commerce to a user, according to an implementation of the invention. In an implementation, the system 100 may prepare and/or complete checkout of product or service purchases related to one or more user inputs. The user inputs may comprise an auditory input (e.g., received via a microphone), a visual input (e.g., received via a camera), a tactile input (e.g., received via a touch sensor device), a keyboard input, a mouse input, or other user input that is recognizable by the system 100. As an example, a natural language utterance may be received from a user and processed to prepare and/or complete checkout of product or service purchases.

In an implementation, system 100 may receive and process a single utterance of a user to determine a product or service that is to be purchased, payment information that is to be used to pay for the product or service, shipping information that is to be used to deliver the product or service, and/or other information that is thereafter utilized to prepare and/or complete the purchase of the product or service.

In one use case, if the user input is a natural language utterance spoken by a user, the natural language utterance may be processed by a speech recognition engine to recognize one or more words of the natural language utterance. The recognized words may then be processed, along with context information associated with the user, by a natural language processing engine to determine one or more products or services and/or other information (e.g., payment information, shipping information, seller information, associated cost information, etc.) that can be used to prepare and/or complete one or more purchase transactions for the products or services. Upon determination of such information, for example, the natural language processing engine may provide the information to one or more applications that then utilize the information to prepare and/or complete the purchase transactions.

As an example, when a user speaks the utterance "Send flowers to my mother," the user's mother may be identified as the recipient of a product that the user intends to purchase (e.g., based on the words "send," "my", and "mother"), and flowers may be identified as the type of product that the user intends to have purchased and delivered to the user's mother (e.g., based on the words "send" and "flowers"). Without necessarily receiving any further input from the user, the system 100 may automatically determine the name and address of the user's mother, a payment method associated with the user, a seller from which flowers are to be purchased, a particular item (e.g., a particular flower purchase order) to be purchased from the seller, and the costs associated with the purchase/delivery of the purchase item. Such information may then be utilized to initiate and/or complete a purchase transaction for the purchase item. The name and address of the user's mother may, for example, be determined by querying the user's profile information, the user's address book(s) or contact list(s), the user's social network(s), one or more people search databases, etc. The payment method associated with the user may be determined by querying the user's profile information. The seller from which flowers are to be purchased or the purchase item from the seller may be determined based on a set of preferred merchants indicated by a service provider (e.g., a company associated with the system 100), preference information associated with the user that identifies merchants approved by the user (e.g., the user's profile information may identify a predefined set of merchants from which the user has approved the system 100 to purchase products or services on behalf of the user), or similar criteria. For example, system 100 may determine which flowers are to be purchased from the merchant's range of offerings based on the user's profile information including the types of items a user likes, qualities of items the user likes, the categories of items a user likes, minimum item rating requirements, item pricing requirements, user location and context information, shipping requirements, etc. The associated costs may be determined based on information regarding the seller, the purchase item, the mother's address, the delivery method (e.g., different fees associated with one-day shipping, two-day shipping, etc.), the payment method (e.g., different fees associated with different payment methods), or other information.

It should be noted that while, in some implementations, a purchase transaction for a product or service may be completed without further user input after receiving a natural language utterance (from which the product or service is determined), user input may be solicited (or received unsolicited) from a user in other implementations to determine payment information, shipping information, seller information, or other information that is to be used to complete the purchase transaction.

In an implementation, upon receipt of a natural language utterance of a user, and without further user input after the receipt of the utterance, the system 100 may process the utterance to determine a product or service to be purchased, and present (e.g., via a graphical user interface, via an auditory user interface, etc.) a request for user confirmation (or user approval) of the product or service, shipping information that is to be used to deliver the product or service, payment information that is to be used to pay for the product or service, and/or other information to ensure that such information is correct and accepted by the user for use with purchasing the product or service. Upon receipt of the requested confirmation from the user, a purchase transaction for the product or service may be completed without further user input after the receipt of the requested confirmation.

As an example, with respect to the above "Send flowers to my mother" utterance scenario, the following information may be presented to the user as part of the user confirmation request: (i) the name and address of the user's mother; (ii) a payment method associated with the user; (iii) a seller from which flowers are to be purchased; (iv) a particular item (e.g., a particular flower purchase order) to be purchased from the seller; and (v) the costs associated with the purchase/delivery of the purchase item. As a further example, the user may provide any of the following utterances—"That's fine," "The information is correct," "Go ahead and purchase the flowers," "Order the flowers," or other utterance—to indicate the user's confirmation to complete the purchase transaction. As such, based on the confirmation, the purchase transaction for the purchase item (e.g., a particular flower purchase order) may be completed (e.g., without further user input after the receipt of the utterance "Send flowers to my mother" other than the confirmation utterance).

In an implementation, user profile information (e.g., name, payment information, shipping information, preferences, etc.) may be pre-stored so that the user profile information may be utilized by system 100 for preparing and/or completing checkout of product or service purchases. In an implementation, defaults associated with the user profile information, such as default payment information, default shipping information, etc., may be automatically or manually pre-set for preparing and/or completing checkout of product or service purchases.

In an implementation, preferred sellers, brands, style, size, or other parameters related to products or services may be automatically or manually pre-set as profile information. As an example, preferred sellers from which products or services are to be purchased and preferred brands of such products or services may be automatically pre-set by the system (e.g., pre-set to system preferred sellers and brands) until the preferences are manually modified by the user. The preferred store, brand, style, size, or other parameters may be obtained (e.g., in response to a natural language utterance indicating a product or service without further user input after the receipt of the utterance) to prepare and/or complete checkout of a product or service purchase unless the utterance (or other information) specifies otherwise. In another implementation, the profile information may include information relating to the general likes or dislikes of the user utilized to select the product or service to be purchased including the types of items a user likes, qualities of items the user likes, the categories of items a user likes, minimum item rating requirements, item pricing requirements, user location and context information, shipping requirements, etc.

In an implementation, preparation and/or completion of checkout of product or service purchases may be limited to certain categories of products or services (e.g., no automobiles), a particular price range (e.g., no more than $100), etc., to reduce the number or severity of purchases related to fraud. The categories of product or services and/or the price ranges may, for instance, be automatically or manually pre-set (e.g., automatically preset by the system, manually pre-set by the user).

Other uses of system 100 are described herein and still others will be apparent to those having skill in the art. Having described a high level overview of some of the system functions, attention will now be turned to various system components that facilitate these and other functions.

System Components

System 100 may include a computer system 104, one or more databases 132, one or more remote information sources 142, 144, 164, and/or other components.

To facilitate these and other functions, computer system 104 may include one or more computing devices 110. Each computing device 110 may include one or more processors 112, one or more storage devices 114, and/or other components.

Processor(s) 112 may be programmed by one or more computer program instructions, which may be stored in storage device(s) 114. The one or more computer program instructions may include, without limitation, voice commerce application 120. Voice commerce application 120 may itself include different sets of instructions that each program the processor(s) 112 (and therefore computer system 104) to perform one or more operations described herein. For example, voice commerce application 120 may include user input processing instructions 122, transaction preparation instructions 124, checkout management instructions 126, profile management instructions 128, user interface instructions 129, and/or other instructions 130 that program computer system 104. Other applications may, of course, include one or more of the instructions 120-130 to perform one or more operations as described herein. As used herein, for convenience, the various instructions will be described as performing an operation, when, in fact, the various instructions program computer system 104 to perform the operation.

In some implementations, a given user device 160 may comprise a given computer device 110. As such, the given user device 160 may comprise processor(s) 112 that are programmed with one or more computer program instructions, such as voice commerce instructions 120, user input processing instructions 122, transaction preparation instructions 124, checkout management instructions 126, profile management instructions 128, user interface instructions 129, and/or other instructions 130.

As used hereinafter, for convenience, the foregoing instructions will be described as performing an operation, when, in fact, the various instructions may program processor(s) 112 (and thereafter computer system 104) to perform the operation.

Registering User Information and Providing Voice Commerce

In an implementation, voice commerce application 120 may register a user to use the system. For example, during registration of a user, voice commerce application 120 may obtain profile information of the user that includes user settings. Information obtained during registration (or registration information) may include, for example, user identification information, payment information, shipping information, user preferences, and/or other information. The registration information may also include preferred sellers, brands, style, size, or other parameters related to products or services as well as limits on the purchase of particular product and service categories and particular price ranges for products or services. In another implementation, the registration information may also include limitations of certain categories of products or services to be purchased and/or particular price ranges of the products or services to be purchased. The registration information may be stored as profile information associated with the user in one or more databases, such as a database 132.

In an implementation, the voice commerce application 120 may process one or more user inputs to prepare and/or complete checkout of product or service purchases related to the one or more user inputs. The user inputs may comprise an auditory input (e.g., received via a microphone), a visual input (e.g., received via a camera), a tactile input (e.g., received via a touch sensor device), an olfactory input, a gustatory input, a keyboard input, a mouse input, or other user input. As an example, a natural language utterance, a natural language gesture, or other natural language user input may be received from a user, and processed to determine the meaning of the user input (and corresponding actions, if any, to be taken) with respect to preparation and completion of a purchase transaction. It should be noted that while, in some implementations, the receipt of a natural language utterance may trigger preparation and/or completion of a purchase transaction with further user input after the receipt of the utterance, the receipt of a natural language input of another type (e.g., gestures or other non-verbal communication) may, in other implementations, trigger preparation and/or completion of a purchase transaction with further user input after the receipt of the input of the other type. As such, to the extent possible, one or more operations described herein as based on a natural language utterance may, in other implementations, instead be based on a natural language input of another type.

The voice commerce application 120 may utilize instructions associated with one or more speech recognition engines, one or more natural language processing engines, or other components for processing user inputs to determine user requests related to the user inputs. For example, voice commerce application 120 may process a single utterance of a user to determine a product or service that is to be purchased, payment information that is to be used to pay for the product or service, shipping information that is to be used to deliver the product or service, and/or other information that is thereafter utilized to prepare and/or complete the purchase of the product or service.

In an implementation, voice commerce application 120 may process a user input (e.g., a natural language utterance) to determine one or more words associated with the user input, and initiate one or more user requests (e.g., queries, commands, etc.) based on the determined words, context information associated with the user (e.g., a current location of the user, the time at which the user spoke the utterance, a product or service recently discussed by the user, or other context), user profile information, or other information. As an example, a user may speak the utterance "Order a pizza for delivery," and the voice commerce application 120 may interpret the utterance and determine that the user's intent is to purchase a pizza for delivery to the user. In one use case, without further user input after receiving the utterance, the voice commerce application 120 may initiate and complete a purchase transaction for the pizza to be delivered. If, for instance, the voice commerce application 120 determines that the user is currently at home, it may complete a purchase transaction with a pizza restaurant from which the user has previously ordered pizza to have the previously ordered pizza delivered to the user's house.

In an implementation, voice commerce application 120 may utilize a user input (e.g., a natural language utterance) to determine a product or service that is to be purchased by searching one or more databases associated with one or more sellers (e.g., partners, third party retailers, service providers, etc.). Results obtained from the search may include one or more products and/or services related to the user input. Each set of results may be individually grouped according to its source or product/service category. The voice commerce application 120 may automatically select the product/service to be purchased from the set of results. As an example, a single utterance may automatically result in the selection of a seller (e.g., a third party retailer) and the selection of a product related to the utterance that is available for purchase via the seller.

In an implementation, the voice commerce application 120 may prepare and/or complete checkout of a product or service purchase related to one or more user inputs. The voice commerce application 120 may determine payment information that is to be used to pay for the product or service, shipping information that is to be used to deliver the product or service, and/or other information that is thereafter utilized to prepare and/or complete the purchase of the product or service. In one implementation, the voice commerce application 120 may automatically complete the checkout of the product or service purchase related to the one or more user inputs. As an example, a single utterance from the user may result in the preparation and/or completion of the checkout of the product or service without further input from the user. In another implementation, the voice commerce application 120 may provide a request for confirmation of the determined product or service, shipping information, payment information, and/or other information to the user to solicit a confirmation from the user to complete the checkout of the product or service purchase.

In an implementation, the voice commerce application 120 may utilize user profile information to prepare and/or complete checkout of product or service purchases via a user input. In an implementation, the voice commerce application 120 may utilize defaults associated with the user profile information, such as default payment information, default shipping information, etc., for preparing and/or completing checkout of product or service purchases. In another implementation, the voice commerce application 120 may utilize product and/or service preferences including preferred sellers, brands, style, size, or other parameters related to products or services for preparing and/or completing checkout of product or service purchases. In another embodiment, the voice commerce application 120 may limit checkout of product or service purchases to certain categories of products or services, a particular price range, etc., to reduce the number or severity of purchases related to fraud. In another implementation, the profile information may determine a product or service to be purchased based from profile information relating to the general likes or dislikes of the user including the types of items a user likes, qualities of items the user likes, the categories of items a user likes, minimum item rating requirements, item pricing requirements, user location and context information, shipping requirements, etc.

Having described high level functions and operations of voice commerce application 120, attention will now be turned to particular functions and operations of voice commerce application 120 as illustrated through its various instructions. The various instructions (e.g., user input processing instructions 122, transaction preparation instructions 124, checkout management instructions 126, profile management instructions 128, user interface instructions 129, and/or other instructions 130) of voice commerce application 120 are described individually as discreet sets of instructions by way of illustration and not limitation, as two or more of the instructions may be combined.

User Input Processing

In an implementation, the user input processing instructions 122 may process one or more user inputs of a user to prepare and/or complete checkout of product or service purchases related to the one or more user inputs. The user inputs may comprise an auditory input (e.g., received via a microphone), a visual input (e.g., received via a camera), a tactile input (e.g., received via a touch sensor device), a keyboard input, a mouse input, or other user input. As described herein elsewhere, user input processing instructions 122 may comprise instructions associated with one or more speech recognition engines (e.g., speech recognition engine(s) 220 of FIG. 2), one or more natural language processing engines (e.g., natural language processing engine(s) 230 of FIG. 2), or other components for processing user inputs to determine user requests related to the user inputs. For example, user input processing instructions 122 may process a natural language utterance of a user to determine a product or service that is to be purchased, payment information that is to be used to pay for the product or service, shipping information that is to be used to deliver the product or service, and/or other information that is thereafter utilized to prepare and/or complete the purchase of the product or service.

In one use case, if the user input is a natural language utterance spoken by a user, the natural language utterance may be processed by a speech recognition engine to recognize one or more words of the natural language utterance. The recognized words may then be processed, along with context information associated with the user, by a natural language processing engine to determine one or more products or services and/or other information (e.g., payment information, shipping information, seller information, associated cost information, etc.) that can be used to prepare and/or complete checkout of product or service purchases when the user provided the natural language utterance.

In an implementation, the user input processing instructions 122 may utilize one or more previous user inputs (e.g., related to a product or service) in processing a particular user input to determine one or more products or services and/or other information (e.g., payment information, shipping information, seller information, associated cost information, etc.) that can be used to prepare and/or complete one or more checkout of product or service purchases.

As an example, a first user input (that occurs prior to a second user input) may be indicative of a user's intent to make a purchase (e.g., without necessarily identifying a product or service type or a product or service), and the second user input may be indicative of a particular product or service type and/or a particular product or service (e.g., without necessarily being indicative of the user's intent to make a purchase). In one use case, for example, a user may provide the utterance "I'm looking to buy something" as the first user input, after which an automated personal assistant (of a related application) may ask the user what the user would like to buy. The user may respond with the second user input by saying "Flowers for my mom." The word "buy" may be recognized when speech recognition is performed on the first user input, and the word "flowers" may be recognized when speech recognition is performed on the second user input. Further processing on the word "buy" may indicate the user's intent to purchase, and further processing on the word "flowers" may indicate the particular product type of a product that the user would like to purchase.

As another example, a first user input (that occurs prior to a second user input) may be indicative of a particular product or service type and/or a particular product or service (e.g., without necessarily being indicative of the user's intent to make a purchase), and the second user input may be indicative of a user's intent to make a purchase (e.g., without necessarily identifying a product or service type or a product or service). In one scenario, for example, the user may provide the utterance "Those are beautiful flowers" while viewing photographs on a friend's social networking page. Subsequently, the user may provide the utterance "I'd like to buy some." The words "those" and "flowers" may be recognized when speech recognition is performed on the first user input, and the words "buy" and "some" may be recognized when speech recognition is performed on the second user input. Further processing on the words "those" and "flowers" may indicate the flowers in the photographs that the user viewed on the friend's social networking page, and further processing on the words "buy" and "some" may indicate the user's intent to make a purchase.

Figure 2:
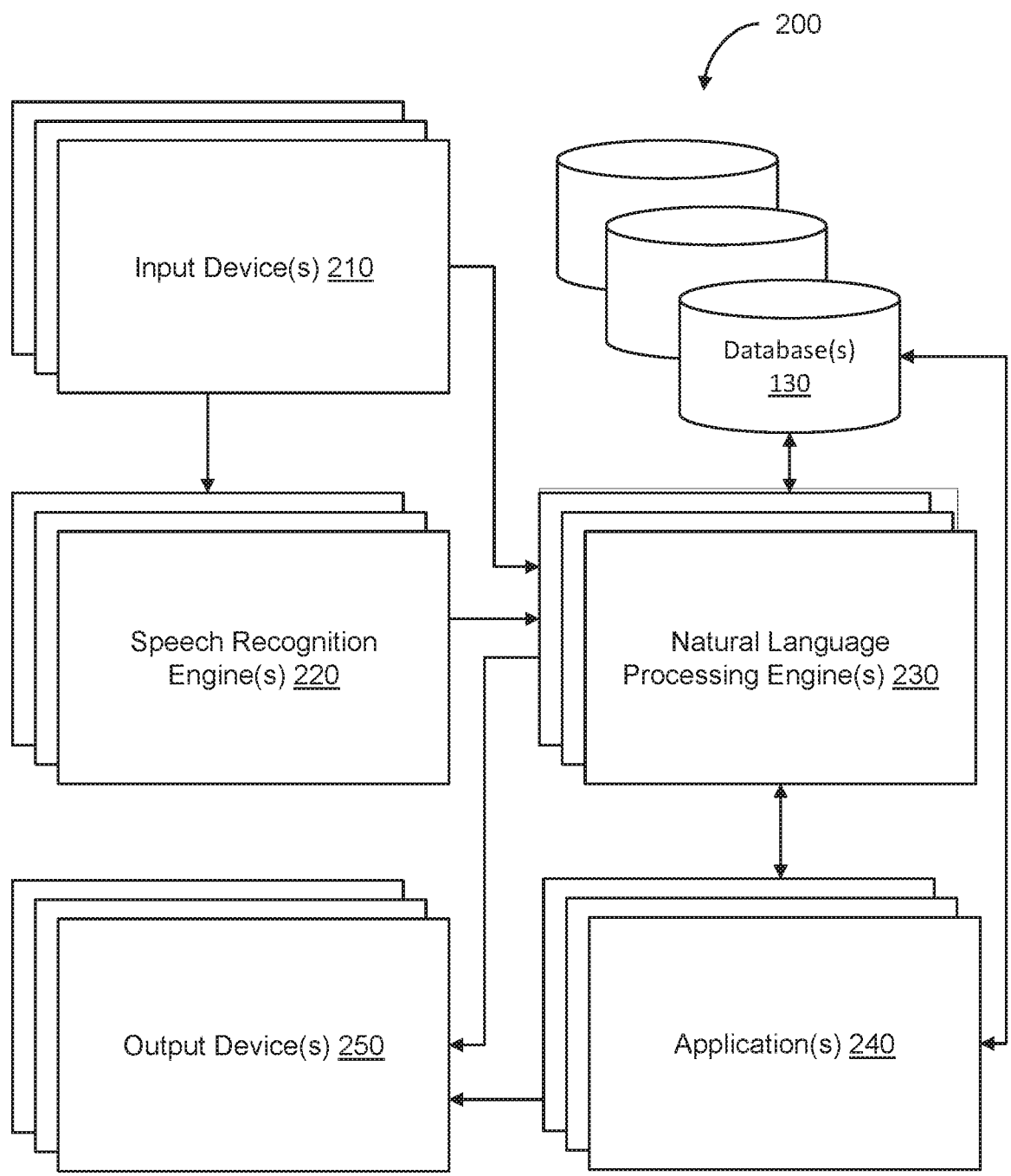
FIG. 2 illustrates a system for facilitating natural language processing, according to an implementation of the invention.

FIG. 2 illustrates a system 200 for facilitating natural language processing, according to an implementation of the invention. As shown in FIG. 2, system 200 may comprise input device(s) 210, speech recognition engine(s) 220, natural language processing engine(s) 230, application(s) 240, output device(s) 250, database(s) 132, or other components.

In an implementation, one or more components of system 200 may comprise one or more computer program instructions of FIG. 1 and/or processor(s) 112 programmed with the computer program instructions of FIG. 1. As an example, speech recognition engine(s) 220 and/or natural language processing engine(s) 230 may comprise user input processing instructions 122, transaction preparation instructions 124, checkout management instructions 126, profile management instructions 128, or other instructions.

Input device(s) 210 may comprise an auditory input device (e.g., microphone), a keyboard, a mouse, or other input devices. Input received at input device(s) 210 may be provided to speech recognition engine(s) 220 and/or natural language processing engine(s) 230.

Speech recognition engine(s) 220 may process one or more inputs received from input device(s) 210 to recognize one or more words represented by the received inputs. As an example, with respect to auditory input, speech recognition engine(s) 220 may process an audio stream captured by an auditory input device to isolate segments of sound of the audio stream. The sound segments (or a representation of the sound segments) are then processed with one or more speech models (e.g., acoustic model, lexicon list, language model, etc.) to recognize one or more words of the received inputs. Upon recognition of the words of received inputs, the recognized words may then be provided to natural language processing engine(s) 230 for further processing. In other examples, natural language processing engine(s) 230 may process one or more other types of inputs (e.g., visual input representing sign language communication, gestures, or other forms of communication) to recognize one or more words represented by the other types of inputs.

Natural language processing engine(s) 230 may receive one or more inputs from input device(s) 210, speech recognition engine(s) 220, application(s) 240, database(s) 132, or other components. As an example, natural language processing engine(s) 230 may process inputs received from input device(s) 210, such as user inputs (e.g., voice, non-voice, etc.), location-based inputs (e.g., GPS data, cell ID, etc.), other sensor data input, or other inputs to determine context information associated with one or more user inputs. As another example, natural language processing engine(s) 230 may obtain profile information, context information, or other information from database(s) 132. The obtained information (or context information determined based on inputs from input device(s) 210) may be processed to determine one or more user inputs of a user. In yet another example, natural language processing engine(s) 230 may process one or more recognized words from speech recognition engine(s) 220 and other information (e.g., information from input device(s) 210, application(s) 240, and/or database(s) 132) to determine one or more user inputs.

In an implementation, natural language processing engine(s) 230, application(s) 240, or other components may store information in database(s) 132 for later use by natural language processing engine(s) 230, application(s) 240, or other components. As an example, as described in further detail elsewhere herein, natural language processing engine(s) 230 may store information regarding user inputs in database(s) 132 and/or update profile information, or other information in database(s) 132 based on the information regarding the user inputs.

Transaction Preparation and Search for Products or Services

In an implementation, transaction preparation instructions 124 may utilize information from a processing of the user inputs (e.g., one or more recognized words, product or service type, product name, seller name, etc.) to determine a product or service that is to be purchased. Transaction preparation instructions 124 may utilize such information to search one or more databases associated with one or more sellers (e.g., partners, third party retailers, service providers, etc.). Results obtained from the search may include one or more products and/or services related to the user input. The results are then utilized by the transaction preparation instructions 124 to select the product or service to be purchased by the user. As an example, a single utterance may automatically result in the selection of a seller (e.g., a third party retailer) and the selection of a product or service related to the utterance that is available for purchase via the seller.

In an implementation, transaction preparation instructions 124 may obtain product or service results related to the user input that are available from a remote information source 140. Remote information sources 140 may include information sources that are accessible to computer system 104 via a remote or external network connection (e.g., outside of a firewall), such as the Internet. For example, as illustrated in FIG. 1, remote information source(s) 140 may include, without limitation, a third party search engine 142 (e.g., GOOGLE, BING, YAHOO, etc.), third party retailers 144, including online retailers and offline retailers having an online presence (e.g., AMAZON, GROUPON, EBAY, EXPEDIA, BESTBUY, etc.), third party service providers 146 (e.g., weather services, calendar/scheduling services, etc.), and/or other information source that is remotely accessible to computer system 104. In another implementation, the transaction preparation instructions 124 may select the product or service (that is to be purchased) from one or more predetermined sets of products or services stored in database 132. For example, system 200 may store one or more sets of predetermined products or services that may be selected by the transaction preparation instructions 124 or included in the product or service results.

In an implementation, transaction preparation instructions 124 may provide a set of product and service results for the search. The transaction preparation instructions 124 may utilize the set of results to select the product or service that is to be purchased. In an implementation, the transaction preparation instructions 124 may select the product or service (that is to be purchased) according to a set of predefined rules. For example, the product or service (that is to be purchased) may be selected based on the user input, location of the user, cost comparison of sellers (e.g., partners, third party retailers, third party service providers, etc.), shipping date comparison of the sellers, or other criteria. In another implementation, the results of the search are presented for selection by the user. In another implementation, the profile information may include information relating to the general likes or dislikes of the user t to determine the product or service to be purchased including the types of items a user likes, qualities of items the user likes, the categories of items a user likes, minimum item rating requirements, item pricing requirements, user location and context information, shipping requirements, etc.

In an implementation, transaction preparation instructions 124 may utilize context information associated with the user to determine the product or service to be purchased. Based on the context information, the transaction preparation instructions 124 may refine the search for products or services to be purchased. In one embodiment, the context information may include personal data associated with the user, data from a database associated with the user, data describing an event, data describing an acoustic environment in which the spoken input is received, location, local time, etc. For example, the transaction preparation instructions 124 may utilize the time of the user input to further define the availability of product or service to be purchased.

Continuing the foregoing examples, a user input related to "lawnmower" may cause transaction preparation instructions 124 to cause a search on a third party search engine 142 to be initiated using the search term "lawnmower." In an implementation, depending on the context (e.g., indicating that the user intends to buy a lawnmower), transaction preparation instructions 124 may add additional search terms such as "purchase" or "sale." Transaction preparation instructions 124 may search (in addition to or instead of) other remote information sources 140 as well (e.g., retail related to "lawnmower" from one or more third party retailers 144, landscaping services related to "lawnmower" from one or more third party service providers 146, and/or other information related to "lawnmower" from one or more other remote information sources 140).

In another embodiment, the transaction preparation instructions 124 may utilize user inputs such as location-based inputs (e.g., GPS data, cell ID, etc.) to further refine the search for products or services to be purchased. The transaction preparation instructions 124 may utilize the location-based input to further refine the geographic area in which the products or services are offered. For example, if the user utters "Please buy a pizza," the transaction preparation instructions 124 utilize the location-based inputs to determine the closest pizzeria in relation to the user. In an implementation, the transaction preparation instructions 124 may utilize website browsing information to refine the search for products or services to be purchased. For example, if the user utters "buy this" while browsing a retailing website, the transaction preparation instructions 124 may utilize website browsing information to determine the product or service the user is viewing. It should be contemplated that the transaction preparation instructions 124 prepares and/or completes checkout of the determined product or service directly from the website (or the seller associated with the website) or from another seller that may not be associated with the website.

In an implementation, the transaction preparation instructions 124 may utilize the profile information to select the product or service and/or the sellers from which the product or service is to be purchased. As described below, the profile information may include preferred sellers, brands, style, size, or other parameters related to products or services that may be automatically or manually pre-set. The profile information may also include the types of items a user likes, qualities of items the user likes, the categories of items a user likes, minimum item rating requirements, item pricing requirements, user location and context information, shipping requirements, etc. The transaction preparation instructions 124 may select the product or service and the sellers (from which the product or service is to be purchased) based on the profile information. As an example, preferred retailers from which products or services is to be purchased and preferred brands of such products or services may be automatically pre-set by the system (e.g., pre-set to system preferred sellers and brands) until the defaults are manually modified by users. The default store, brand, style, size, or other parameters may be obtained (in response to an utterance indicative of a user's intent to purchase a product or service) to prepare and/or complete checkout of a product or service purchase unless the single utterance (or other information) specifies otherwise.

In an implementation, selection of the product or service purchases by the transaction preparation instructions 124 may be limited to certain categories of products or services (e.g., no automobiles), a particular price range (e.g., no more than $100), etc., to reduce the number or severity of purchases related to fraud. The categories of product or services and/or the price ranges may, for instance, be automatically or manually pre-set (e.g., automatically preset by the system, manually pre-set by the user) and stored in the profile information.

In one implementation, the transaction preparation instructions 124 may provide prospective transactions or offers to the user based on the user's profile information. For example, the transaction preparation instructions 124 may prepare a transaction for the user without any input from the user. In one implementation, the transaction preparation instructions 124 may analyze the user's profile information to determine any potential transaction opportunities, and provide a prospective transaction or offer related to the potential transaction opportunity. For example, in the case that voice commerce application 120 determines an upcoming anniversary of the user, the transaction preparation instructions 124 may prepare a prospective purchase for the user related to the anniversary. In another implementation, the transaction preparation instructions 124 may provide offers to the user related to purchases for the potential transaction opportunity.

In an implementation, an administrator of the system 100 (or a subsystem thereof) may manage a set of predetermined sellers from whose inventories are searched for available products or services in response to a user input indicative of a user's intent to purchase. As an example, the administrator may specify a set of sellers that have priority over other sellers in having their products or services offered to users. Thus, a seller from which a product or service is to be purchased may be selected from the predetermined set of sellers specified by the administrator. Other criteria may, of course, be considered when selecting a seller with which a user is to complete a purchase transaction for a product or service.

Checkout Management

In an implementation, the checkout management instructions 126 may prepare and/or complete checkout of selected product or service purchases related to one or more user inputs. The checkout management instructions 126 may determine payment information that is to be used to pay for a selected product or service, shipping information that is to be used to deliver the selected product or service, and/or other information that is thereafter utilized to prepare and/or complete the purchase of the selected product or service. For example, the checkout management instructions 126 may utilize default payment information stored in the profile information for preparing or completing checkout of the selected product or service. Likewise, the checkout management instructions 126 may utilize default shipping information stored in the profile information for preparing or completing checkout of the selected product or service. In another implementation, the checkout management instructions 126 utilize an address book or contact list of the user stored in the profile information to provide shipping information for checkout of products or services for individuals other than the user. For example, a user input may reference an individual, other than the user, that is recognized by the user input processing instructions 122 (e.g., "Send flowers to my mom" wherein the user's mom is recognized as the intended recipient of the flowers). The checkout management instructions 126 may utilize the address book or contact list of the user to determine if the referenced individual's address is available for input as the shipping information.

In one implementation, the checkout management instructions 126 automatically complete the checkout of the product or service purchase. As an example, a single utterance from the user may result in the completion of checkout of the product or service without further input or approval from the user. In another implementation, the checkout management instructions 126 may present a request for confirmation of the determined product or service, shipping information, payment information, and/or other information to the user to solicit a confirmation from the user to complete the checkout of the product or service purchase. For example, the checkout management instructions 126 may prepare all of the aspects (e.g., payment information, shipping information, etc.) of checkout of the product or service purchase but wait until confirmation from the user to complete checkout.

In an implementation, the checkout management instructions 126 may utilize user profile information for preparing and/or completing checkout of product or service purchases via a user input. In an implementation, the checkout management instructions 126 may utilize defaults associated with the user profile information, such as default payment information, default shipping information, etc., for preparing and/or completing checkout of product or service purchases. In another implementation, the checkout management instructions 126 utilize an address book or contact list of the user stored in the profile information to provide shipping information for checkout of products or services for individuals other than the user.

Profile Management

In an implementation, stored user profile information (e.g., name, payment information, shipping information, preferences, etc.) may be utilized by voice commerce application 120 for preparing and/or completing checkout of product or service purchases. In an implementation, profile management instructions 128 may automatically set defaults associated with the user profile information, such as default payment information, default shipping information, etc. In another implementation, profile management instructions 128 may automatically or manually pre-set profile information for preparing and/or completing checkout of product or service purchases. In an implementation, profile management instructions 128 enable the user to set profile information including default payment and shipping information utilized by the voice commerce application 120.

In an implementation, profile management instructions 128 may automatically or pre-set preferred sellers, brands, style, size, or other parameters related to products or services. As an example, preferred retailers or service providers from which products or services are to be purchased and preferred brands of such products or services may be automatically pre-set by the profile management instructions 128 (e.g., pre-set to system preferred sellers and brands) until the preferences are manually modified by users. The preferred store, brand, style, size, or other parameters may be obtained (in response to a single utterance) to prepare and/or complete checkout of a product or service purchase unless the single utterance (or other information) specifies otherwise. In an implementation, profile management instructions 128 enable the user to set preferred sellers, brands, style, size, or other parameters related to products or services utilized by the voice commerce application 120. The profile management instructions 128 may automatically or pre-set information relating to the general likes or dislikes of the user to determine a product or service to be purchased including the types of items a user likes, qualities of items the user likes, the categories of items a user likes, minimum item rating requirements, item pricing requirements, user location and context information, shipping requirements, etc.

In an implementation, profile management instructions 128 may automatically or pre-set limits of checkout of product or service purchases to certain categories of products or services (e.g., no automobiles), a particular price range (e.g., no more than $100), etc., to reduce the number or severity of purchases related to fraud. The categories of product or services and/or the price ranges may, for instance, be automatically or manually pre-set (e.g., automatically preset by the system, manually pre-set by the user). In an implementation, profile management instructions 128 enable the user to set limits of checkout of product or service purchases to certain categories of products or services (e.g., no automobiles), a particular price range (e.g., no more than $100), or other criteria.

In another implementation, profile management instructions 128 may store profile information relating to the user's personal information. For example, the profile information may include the user's address book or contact list, calendar, and other information which assist the voice commerce application 120 in determining products or services to be purchased. In one implementation, the user's personal information may be pre-stored based on the registration information or otherwise set by the user.

User Interface

In an implementation, user interface instructions 129 may generate a voice commerce interface. The voice commerce interface may provide status information relating to the preparation and/or completion of checkout of product or service purchases. For example, the voice commerce interface may indicate to a user when checkout of product or service purchases is completed. In one implementation, the user interface instructions 129 may also provide the user with a request for confirmation to complete checkout of a product or service purchase. Examples of the voice commerce interface are illustrated with respect to FIGS. 5, 6A, and 5B.

In an implementation, user interface instructions 129 may generate a profile information management interface. The profile management interface may allow the user to set profile information related to the purchase of products or services. For example, the profile management interface enables the user to set default payment and shipping information. The profile management interface may also enable the user to set preferred sellers, brands, style, size, or other parameters related to products or services as well as limits of certain categories of products or services and particular price ranges.

Examples of System Architectures and Configurations

Different system architectures may be used. For example, all or a portion of voice commerce application 120 may be executed on a user device. In other words, computing device 110 as illustrated may include a user device operated by the user. In implementations where all or a portion of voice commerce application 120 is executed on the user device, the user device may search remote information sources, prepare or complete checkout of product or service purchases, generate the interface, and/or perform other functions/operations of voice commerce application 120.

All or a portion of voice commerce application 120 may be executed on a server device. In other words, computing device 110 as illustrated may include a server device that obtains a user request from a user device operated by the user. In implementations where all or a portion of voice commerce application 120 is executed on the server device, the server device may search remote information sources 140, obtain sets of results, prepare or complete checkout of product or service purchases, provide the interface to a user device, and/or perform other functions/operations of voice commerce application 120.

Although illustrated in FIG. 1 as a single component, computer system 104 may include a plurality of individual components (e.g., computer devices) each programmed with at least some of the functions described herein. In this manner, some components of computer system 104 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

It should be appreciated that although the various instructions are illustrated in FIG. 1 as being co-located within a single computing device 110, one or more instructions may be executed remotely from the other instructions. For example, some computing devices 110 of computer system 104 may be programmed by some instructions while other computing devices 110 may be programmed by other instructions, as would be appreciated. Furthermore, the various instructions described herein are exemplary only. Other configurations and numbers of instructions may be used, so long as processor(s) 112 are programmed to perform the functions described herein.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor(s) 112 as well as data that may be manipulated by processor(s) 112. The storage device may comprise floppy disks, hard disks, optical disks, tapes, or other storage media for storing computer-executable instructions and/or data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

User device(s) may include a device that can interact with computer system 104 through network 102. Such user device(s) may include, without limitation, a tablet computing device, a smartphone, a laptop computing device, a desktop computing device, a network-enabled appliance such as a "Smart" television, a vehicle computing device, and/or other device that may interact with computer system 104.

The various databases 132 described herein may be, include, or interface to, for example, an Oracle™ relational database sold commercially by Oracle Corporation. Other databases, such as Informix™, DB2 (Database 2) or other data storage, including file-based (e.g., comma or tab separated files), or query formats, platforms, or resources such as OLAP (On Line Analytical Processing), SQL (Structured Query Language), a SAN (storage area network), Microsoft Access™, MySQL, PostgreSQL, HSpace, Apache Cassandra, MongoDB, Apache CouchDB™, or others may also be used, incorporated, or accessed. The database may comprise one or more such databases that reside in one or more physical devices and in one or more physical locations. The database may store a plurality of types of data and/or files and associated data or file descriptions, administrative information, or any other data. The database(s) 132 may be stored in storage device 114 and/or other storage that is accessible to computer system 104.

Example Flow Diagrams

The following flow diagrams describe operations that may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Figure 3:
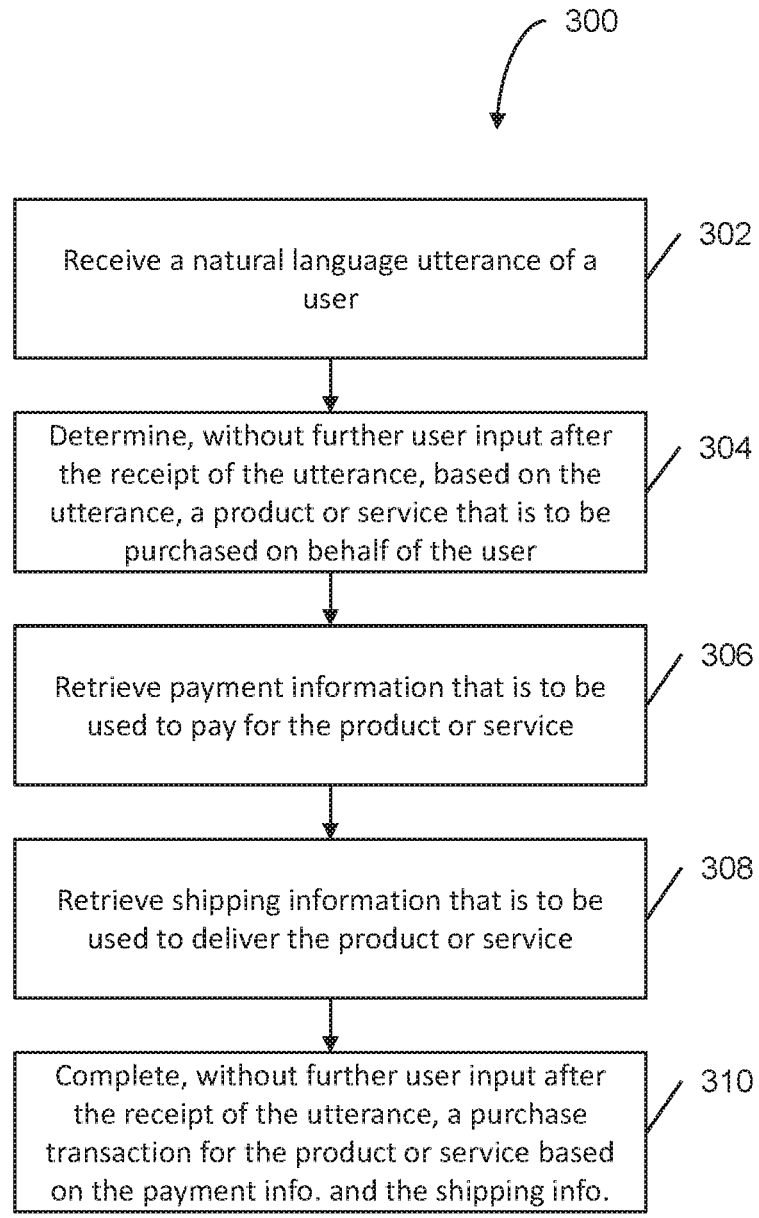
FIG. 3 illustrates a flow diagram of a process for providing voice commerce, according to an implementation of the invention.

FIG. 3 depicts a data flow diagram for a process 300 for providing voice commerce, according to an implementation of the invention. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 302, a natural language utterance of a user may be received. As an example, upon receipt, the natural language utterance may be processed by a speech recognition engine to recognize one or more words of the natural language utterance. The recognized words may then be processed, along with context information associated with the user, by a natural language processing engine to determine one or more products or services and/or other information (e.g., payment information, shipping information, seller information, associated cost information, etc.) that can be used to prepare and/or complete checkout of product or service purchases.

In an operation 304, a product or service to be purchased on behalf of the user may be determined based on the natural language utterance. As an example, upon recognition of one or more words associated with the natural language utterance that are related to at least one product or service, the product/service-related words may be utilized to search one or more databases associated with one or more third party retailers and/or service providers, and obtain results indicating one or more products or services. The results may then be processed, along with context information associated with the user, to select the most relevant product or service as the product or service that is to be purchased on behalf of the user.

As illustrated by FIG. 3, in one implementation, the product or service that is to be purchased may be determined without any further user input after the receipt of the natural language utterance (from which the determination of the product or service to be purchased is based). In another implementation, the product or service that is to be purchased may be determined without further user input identifying the product or service after the receipt of the natural language utterance.

In an operation 306, payment information that is to be used to pay for the product or service may be retrieved. As an example, default payment information associated with the user (e.g., for paying for product or services on behalf of the user) may be stored as profile information associated with the user. Such default payment may, for example, be retrieved from one or more databases storing the user's profile information, and utilized to pay for the product or service.

In an operation 308, shipping information that is to be used to deliver the product or service may be retrieved. As an example, default shipping information associated with the user (e.g., for delivering products or services on behalf of the user) may be stored as profile information associated with the user. Such default shipping information may, for instance, retrieved from one or more databases storing the user's profile information, and be utilized to deliver the product or service.

In an operation 310, a purchase transaction for the product or service may be completed based on the payment information and the shipping information.

As illustrated by FIG. 3, in one implementation, the purchase transaction may be completed without any further user input after the receipt of the natural language utterance (from which the determination of the product or service to be purchased is based). In another implementation, the product or service that is to be purchased may be determined without further user input identifying the product or service, identifying the payment information, or identifying the shipping information after the receipt of the natural language utterance.

Figure 4:
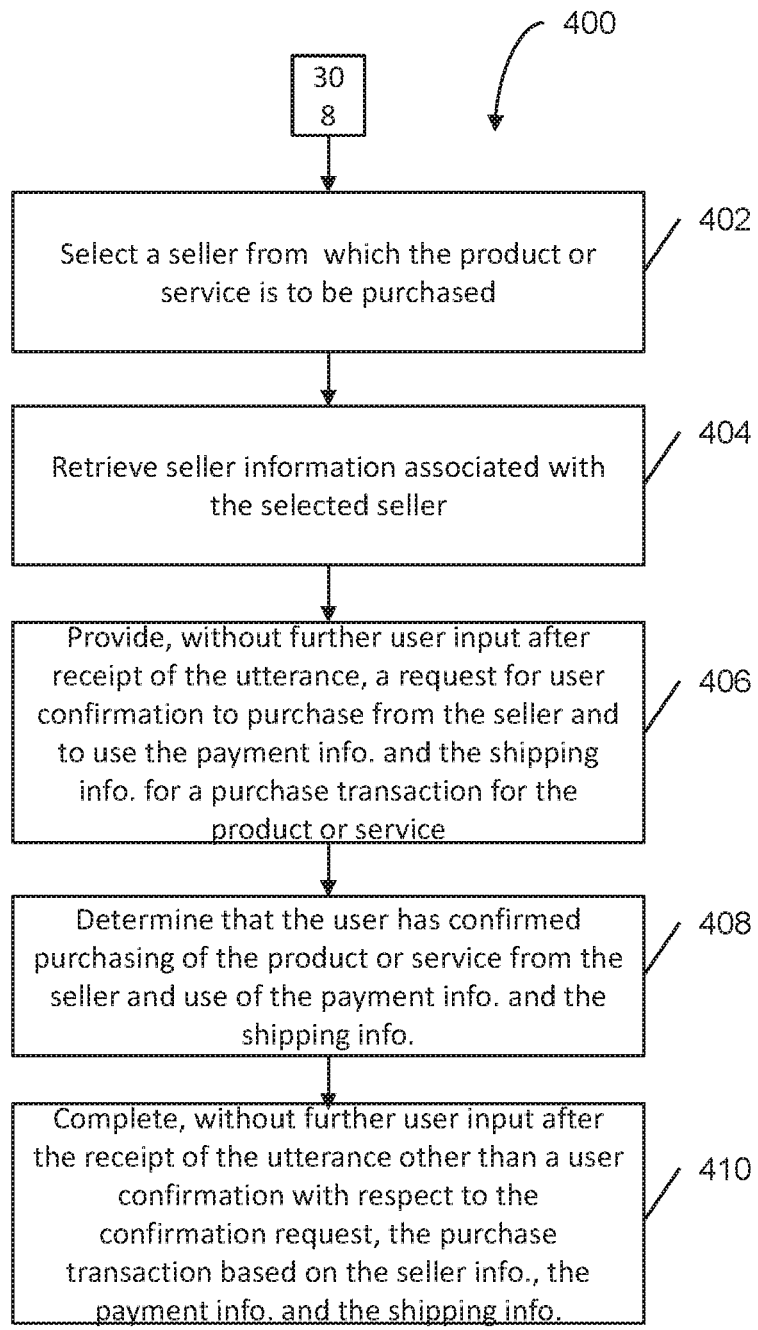
FIG. 4 illustrates a flow diagram of another process for providing voice commerce, according to an implementation of the invention.

FIG. 4 depicts a data flow diagram for another process 400 for providing voice commerce, according to an implementation of the invention. The various processing operations and/or data flows depicted in FIG. 4 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

As illustrated by FIG. 3, a natural language utterance of a user may be received, and a product or service that is to be purchased on behalf of the user may be determined based on the natural language utterance without further user input after the receipt of the natural language utterance. Payment information that is to be used to pay for the product or service, and shipping information that is to be used to deliver the product or service, may also be retrieved.

Referring back to FIG. 4, in an operation 402, a seller from which the product or service is to be purchased may be selected. As an example, the user may have specified a set of sellers from which the user prefers to purchase products or services. As such, the seller may be selected from the predetermined set of sellers specified by the user. As another example, an administrator of the system 100 (or of a subsystem of the system 100) may have specified a set of sellers that have priority over other sellers in having their products or services offered to users. Thus, the seller may be selected from the predetermined set of sellers specified by the administrator. As yet another example, a database of sellers may be queried to determine which seller has the product or service available for purchase. The sellers that have the product or service available for purchase may then be compared against one another to determine, for example, which seller has the lower price (or overall lower total purchase costs) for the product or service, which sellers has the highest customer rating, or other criteria in selecting the seller from which the product or service is to be purchased.

In an operation 404, seller information associated with the selected seller may be retrieved. As an example, seller information may comprise a name of the seller, contact information associated with the seller, a price at which the seller will sell the product or service to the user, individual or overall costs involved with purchase of the product or service from the seller, a refund policy of the seller for the product or service, or other information.

In an operation 406, a request for user confirmation (to purchase the product or service from the seller and to use the payment information and the shipping information for a purchase transaction for the product or service) may be provided without further user input after the receipt of the utterance.

In an operation 408, it may be determined that the user has confirmed purchasing of the product or service from the seller and use of the payment information and the shipping information for the purchase transaction. As such, in an operation 410, the purchase transaction may be completed based on the seller information, the payment information, and the shipping information without further user input after the receipt of the utterance other than a user confirmation with respect to the confirmation request.

Example Screenshots

Figure 5:
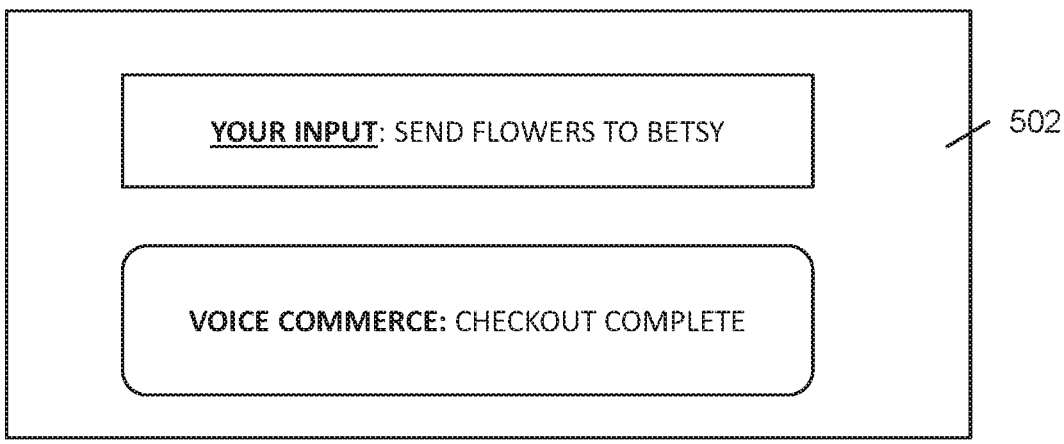
FIG. 5 illustrates a screenshot of a user interface which facilitates voice commerce, according to an implementation of the invention.

FIG. 5 illustrates a screenshot 502 of a user interface which facilitates voice commerce, according to an implementation of the invention. The described screenshots may be accomplished using some or all of the system components described in detail above. As shown in screenshot 502 of FIG. 5, a voice commerce application may enable the user to complete checkout of product or service purchases via a single utterance. As depicted in screenshot 502, the user may say "Send flowers to Betsy." In response to receiving the utterance from the user, the voice commerce application may determine that flowers are to be purchased, and select a third party retailer from which to purchase the flowers. As an example, the user may have purchased a particular kind of flower (e.g., red roses) for Betsy numerous times in the past. As such, the particular kind of flower may be determined as the particular product that is to be purchased on behalf of the user for Betsy. The selection of the product may, for example, be performed without further user input identifying the product type (e.g., flowers) after the receipt of the utterance, without any further user input after the receipt of the utterance, etc.

The voice commerce application may also determine the payment information to be used to pay for the flowers. Because the utterance indicates that the flowers are to be sent to Betsy, the voice commerce application may determine Betsy's address from the user's address book or contact list and provide Betsy's shipping information to the retailer. The voice commerce application may then, for example, complete a purchase transaction using seller information associated with the third party retailer, the payment information, the shipping information, or other information without further user input from the user. Upon completing the purchase transaction for the flowers, the voice commerce application may indicate that checkout for the flowers has been completed. In an implementation, the product to be purchased, a seller from which the product is to be purchased, payment information, shipping information, or other information may be displayed to the user.

Figure 6A:
FIGS. 6A and 6B illustrate screenshots of a user interface which facilitates voice commerce, according to an implementation of the invention.
Figure 6B:
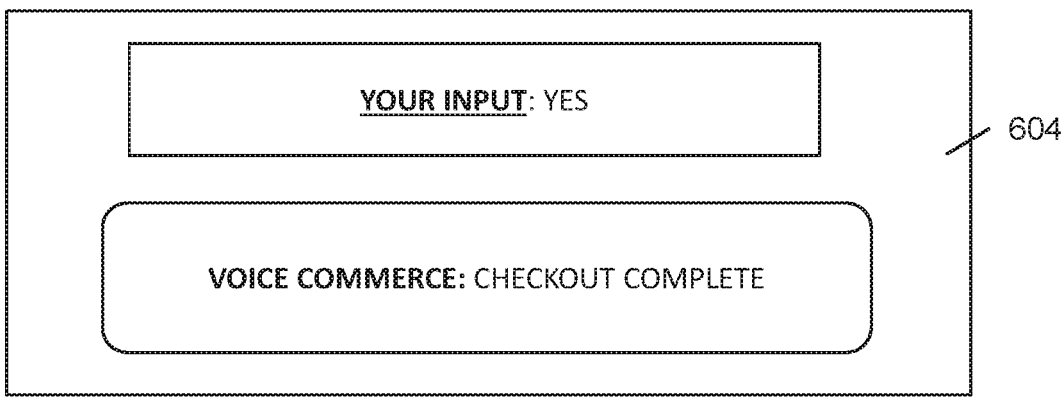

FIGS. 6A and 6B illustrate screenshots 602 and 604 of another user interface which facilitates voice commerce, according to an implementation of the invention. The described screenshots may be accomplished using some or all of the system components described in detail above. As shown in screenshot 602 of FIG. 6A, a voice commerce application may solicit a user confirmation from a user with respect to a product purchase before completing checkout of the product purchase. As depicted in screenshot 602, the user may say "Send flowers to Betsy." In response to receiving the single utterance from the user, the voice commerce application may determine that flowers are to be purchased, and select a third party retailer from which to purchase the flowers. The voice commerce application may also determine the payment information to be used to pay for the flowers. Because the utterance indicates that the flowers are be sent to Betsy, the voice commerce application may determine Betsy's address from the user's address book or contact list and provide Betsy's shipping information to the retailer. The voice commerce application may then present a request for user confirmation of the purchase to the user (e.g., without further user input after the receipt of the utterance). As shown in screenshot 604, the user may confirm purchase of the flowers by saying "Yes." Upon confirmation of the purchase, the voice commerce application may indicate that checkout for the flowers has been completed.

FIG. 7A illustrates a screenshot 702 of a user interface which facilitates management of user profile information, according to an implementation of the invention. The described screenshots may be accomplished using some or all of the system components described in detail above. As shown in screenshot 702, the user profile information interface includes the user name, default payment information, and default shipping information. The user may edit any data fields associated with the user name, default payment information, and default shipping information.

FIG. 7B illustrates a screenshot 704 of another user interface which facilitates management of user profile information, according to an implementation of the invention. The described screenshots may be accomplished using some or all of the system components described in detail above. As shown in screenshot 704, the user profile information interface may enable the user to pre-set preferences of different products and/or services to be purchased. The profile information interface includes a product/service category that may be selected by the user. For each product/service category, the user may select preferred sellers, preferred brands, preferred styles, preferred sizes, and other parameters related to the products/services to be selected. The user may also limit certain categories of products or services to a particular price range. The user may edit any data field associated with product/service category to include preferred retail stores/service providers, preferred brands, preferred styles, preferred sizes, and price ranges.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for providing voice commerce, the method being implemented on a computer system having one or more physical processors programmed with computer program instructions which, when executed, perform the method, the method comprising:
   receiving, by the computer system, a single first user input comprising a natural language utterance;
   providing, by the computer system, the natural language utterance as an input to a speech recognition engine;
   obtaining, by the computer system, one or more words or phrases recognized from the natural language utterance as an output of the speech recognition engine;
   searching, by the computer system, one or more databases of products or services based on the one or more words or phrases;
   selecting, by the computer system, without further user input other than the single first user input, a product or service from the database to be purchased based on the search;
   receiving, by the computer system, a second user input indicating confirmation by a user to complete a purchase transaction of the selected product or service; and
   completing, by the computer system, without further user input after the receipt of the second user input, a purchase transaction of the selected product or service.

2. The method of claim 1, wherein selecting the product or service further comprises:
   determining, by the computer system, a context based at least on the one or more words or phrases, wherein the product or service is selected based at least on the determined context.

3. The method of claim 1, wherein completing the purchase transaction for the selected product or service comprises:
   obtaining, by the computer system, payment information with which to pay for the selected product or service, wherein the purchase transaction is completed based on the payment information without receiving confirmation of the payment information by the user.

4. The method of claim 1, wherein completing the purchase transaction for the selected product or service comprises:
   obtaining, by the computer system, shipping information with which to deliver the selected product or service, wherein the shipping information specifies a name or address of a recipient to which the selected product or service is to be delivered after the selected product or service is purchased, and wherein the purchase transaction is completed based on the shipping information without receiving confirmation of the shipping information by the user.

5. The method of claim 1, the method further comprising:
   obtaining, by the computer system, seller information describing one or more products or services available from one or more sellers via one or more remote information sources; and
   storing, by the computer system, the seller information in the one or more databases.

6. The method of claim 5, wherein the one or more remote information sources comprise at least a third party search engine, a third party retailer, and/or a third party service provider.

7. The method of claim 5, wherein the method further comprises:
   selecting, by the computer system, a seller from which to purchase the selected product or service.

8. The method of claim 7, wherein the seller information comprises a price at which the one or more sellers will sell the one or more products or services, wherein selecting the seller comprises selecting the seller based on the price at which the seller will sell the selected product or service.

9. The method of claim 7, the method further comprising:
   obtaining, by the computer system, user profile information associated with the user, wherein the user profile information indicates a predetermined set of sellers associated with the user, wherein selecting the seller comprises selecting the seller from the predetermined set of sellers indicated by the user profile information.

10. The method of claim 7, the method further comprising:
obtaining, by the computer system, a predetermined set of sellers specified by an administrator of the system that is different than the user, wherein selecting the seller comprises selecting the seller from the predetermined set of administrator-specified sellers.

11. The method of claim 1, wherein completing the purchase transaction of the selected product or service comprises:
obtaining, by the computer system, payment information with which to pay for the selected product or service; and
obtaining, by the computer system, shipping information with which to deliver the selected product or service, wherein the shipping information specifies a name or address of a recipient to which the selected product or service is to be delivered after the selected product or service is purchased, and wherein the purchase transaction is completed based on the payment information and the shipping information.

12. The method of claim 11, the method further comprising:
identifying, by the computer system, an intended recipient of the identified product or service based on the single first user input and/or the second user input, and wherein obtaining the shipping information comprises:
obtaining, by the computer system, an address of the intended recipient.

13. The method of claim 12, wherein obtaining the address of the intended recipient comprises:
accessing, by the computer system, an address book of the user, wherein the address book comprises an identification of the intended recipient and the address of the intended recipient.

14. The method of claim 11, the method further comprising:
completing, by the computer system, the purchase transaction without receiving confirmation of the payment information or the shipping information by the user.

15. The method of claim 1, the method further comprising:
providing, by the computer system, without further user input after the receipt of other than the single first user input, a request for user confirmation to complete the purchase transaction for the selected product or service, wherein the second user input is received responsive to the request;
determining, by the computer system, that the user has confirmed the purchase transaction based on the second user input, wherein the purchase transaction of the selected product or service is completed based on the determination.

16. A system for providing voice commerce, the system comprising:
one or more physical processors programmed with computer program instructions which, when executed, cause the one or more physical processors to:
receive a single first user input comprising a natural language utterance;
provide the natural language utterance as an input to a speech recognition engine;
obtain one or more words or phrases recognized from the natural language utterance as an output of the speech recognition engine;
search one or more databases of products or services based on the one or more words or phrases;
select, without further user input other than the single first user input, a product or service from the database to be purchased based on the search;
receive a second user input indicating confirmation by a user to complete a purchase transaction of the selected product or service; and
complete, without further user input after the receipt of the second user input, a purchase transaction of the selected product or service.

17. The system of claim 16, wherein to select the product or service, the one or more physical processors are further caused to:
determine a context based at least on the one or more words or phrases, wherein the product or service is selected based at least on the determined context.

18. The system of claim 16, wherein to complete the purchase transaction for the selected product or service, the one or more physical processors are further caused to:
obtain, without further user input after the receipt of the user input, payment information with which to pay for the selected product or service, wherein the purchase transaction is completed based on the payment information without receiving confirmation of the payment information by the user.

19. The system of claim 16, wherein to complete the purchase transaction for the selected product or service, the one or more physical processors are further caused to:
obtain, shipping information with which to deliver the selected product or service, wherein the shipping information specifies a name or address of a recipient to which the selected product or service is to be delivered after the selected product or service is purchased, and wherein the purchase transaction is completed based on the shipping information without receiving confirmation of the shipping information by the user.

20. The system of claim 16, wherein the one or more physical processors are further caused to:
obtain seller information describing one or more products or services available from one or more sellers via one or more remote information sources; and
store the seller information in the one or more databases.

21. The system of claim 20, wherein the one or more remote information sources comprise at least a third party search engine, a third party retailer, and/or a third party service provider.

22. The system of claim 20, wherein the one or more physical processors are further caused to:
select a seller from which to purchase the selected product or service.

23. The system of claim 22, wherein the seller information comprises a price at which the one or more sellers will sell the one or more products or services, wherein to select the seller, the one or more physical processors are further caused to:
select the seller based on the price at which the seller will sell the selected product or service.

24. The system of claim 22, wherein the one or more physical processors are further caused to:
obtain user profile information associated with the user, wherein the user profile information indicates a predetermined set of sellers associated with the user, wherein selecting the seller comprises selecting the seller from the predetermined set of sellers indicated by the user profile information.

25. The system of claim 22, wherein the one or more physical processors are further caused to:
obtain a predetermined set of sellers specified by an administrator of the system that is different than the user, wherein selecting the seller comprises selecting the seller from the predetermined set of administrator-specified sellers.

26. The system of claim 16, wherein to complete the purchase transaction of the selected product or service, the one or more physical processors are further caused to:
obtain payment information with which to pay for the selected product or service; and
obtain shipping information with which to deliver the selected product or service, wherein the shipping information specifies a name or address of a recipient to which the selected product or service is to be delivered after the selected product or service is purchased, and wherein the purchase transaction is completed based on the payment information and the shipping information.

27. The system of claim 26, wherein the one or more physical processors are further caused to:
identify an intended recipient of the identified product or service based on the single first user input and/or the second user input, and wherein to obtain the shipping information, the one or more physical processors are further caused to:
obtain an address of the intended recipient.

28. The system of claim 27, wherein to obtain the address of the intended recipient, the one or more physical processors are further caused to:
access an address book of the user, wherein the address book comprises an identification of the intended recipient and the address of the intended recipient.

29. The system of claim 26, wherein the one or more physical processors are further caused to:
complete the purchase transaction without receiving confirmation of the payment information or the shipping information by the user.

30. The system of claim 16, wherein the one or more physical processors are further caused to:
provide, without further user input other than the single first user input, a request for user confirmation to complete the purchase transaction for the selected product or service, wherein the second user input is received responsive to the request;
determine that the user has confirmed the purchase transaction based on the second user input, wherein the purchase transaction of the selected product or service is completed based on the determination.

31. A method for providing voice commerce, the method being implemented on a computer system having one or more physical processors programmed with computer program instructions which, when executed, perform the method, the method comprising:
receiving, by the computer system, a single first user input comprising a natural language utterance;
recognizing, by the computer system, one or more words or phrases from the natural language utterance;
searching, by the computer system, one or more databases of products or services based on the one or more recognized words or phrases from the single first user input, and without using further user input other than the single first user input;

causing, by the computer system, a set of search results to be presented to a user based on the search, the search results indicating one or more products or services from the database available for purchase;
receiving, by the computer system, a second user input comprising a selection from the set of search results, the selection identifying one or more products or services from the database to be purchased on behalf of the user based on the second user input;
obtaining, by the computer system, user profile information associated with the user;
identifying, by the computer system, payment information and shipping information based on the user profile information; and
completing, by the computer system, without further user input after identifying the payment information and the shipping information, a purchase transaction of the identified one or more products or services.

32. The method of claim 31, wherein recognizing the one or more words or phrases from the natural language utterance comprises:
providing, by the computer system, the natural language utterance as an input to a speech recognition engine; and
obtaining, by the computer system, the one or more words or phrases recognized from the natural language utterance as an output of the speech recognition engine.

33. The method of claim 31, the method further comprising:
obtaining, by the computer system, seller information describing one or more products or services available from one or more sellers via one or more remote information sources; and
storing, by the computer system, the seller information in the one or more databases.

34. The method of claim 31, wherein completing the purchase transaction without further user input after identifying the payment information and the shipping information comprises:
completing, by the computer system, the purchase transaction without receiving confirmation of the payment information or the shipping information by the user.

35. A system for providing voice commerce, the system comprising:
one or more physical processors programmed with computer program instructions which, when executed, cause the one or more physical processors to:
receive a single first user input comprising a natural language utterance;
recognize one or more words or phrases from the natural language utterance;
search one or more databases of products or services based on the one or more recognized words or phrases from the single first user input, and without using further user input other than the single first user input;
cause a set of search results to be presented to a user based on the search, the search results indicating one or more products or services from the database available for purchase;
receive a second user input comprising a selection from the set of search results, the selection identifying one or more products or services from the database to be purchased on behalf of the user based on the second user input;

obtain user profile information associated with the user;

identify payment information and shipping information based on the user profile information; and complete, without further user input after identifying the payment information and the shipping information, a purchase transaction of the identified one or more products or services.

36. The system of claim 35, wherein to recognize the one or more words or phrases from the natural language utterance, the one or more physical processors are further caused to:

provide the natural language utterance as an input to a speech recognition engine; and obtain the one or more words or phrases recognized from the natural language utterance as an output of the speech recognition engine.

37. The system of claim 35, wherein the one or more physical processors are further caused to:

obtain seller information describing one or more products or services available from one or more sellers via one or more remote information sources; and store the seller information in the one or more databases.

38. The system of claim 35, wherein to complete the purchase transaction without further user input after identifying the payment information and the shipping information, the one or more physical processors are further caused to:

complete the purchase transaction without receiving confirmation of the payment information or the shipping information by the user.

39. The method of claim 1, the method further comprising:

presenting a prompt that identifies the selected product or service, the cost associated with the purchase of the selected product or service, payment information to pay the associated cost, and shipping information specifying where the selected product or service is to be delivered; and soliciting approval of the identified information as the second user input.

40. The system of claim 16, wherein the one or more physical processors to are further caused to:

present a prompt that identifies the selected product or service, the cost associated with the purchase of the selected product or service, payment information to pay the associated cost, and shipping information specifying where the selected product or service is to be delivered; and solicit approval of the identified information as the second user input.

* * * * *